(12) United States Patent
Sprungman et al.

(10) Patent No.: US 10,130,030 B2
(45) Date of Patent: Nov. 20, 2018

(54) TRIMMER HEAD

(71) Applicant: MTD Products Inc, Valley City, OH (US)

(72) Inventors: Michael Robert Sprungman, Chandler, AZ (US); Charles Lee Cites, Chandler, AZ (US)

(73) Assignee: MTD Products Inc, Valley City, OH (US)

( * ) Notice: Subject to any disclaimer, the term of this patent is extended or adjusted under 35 U.S.C. 154(b) by 865 days.

(21) Appl. No.: 14/287,977

(22) Filed: May 27, 2014

(65) Prior Publication Data

US 2015/0342116 A1    Dec. 3, 2015

(51) Int. Cl.
*A01D 34/416*    (2006.01)

(52) U.S. Cl.
CPC ..... *A01D 34/4163* (2013.01); *A01D 34/4166* (2013.01)

(58) Field of Classification Search
None
See application file for complete search history.

(56) References Cited

U.S. PATENT DOCUMENTS

| | | |
|---|---|---|
| 4,817,289 A | 4/1989 | Baba |
| 5,023,998 A | 6/1991 | Masciarella et al. |
| 5,193,278 A | 3/1993 | Osakabe et al. |
| 5,222,301 A * | 6/1993 | Sugihara ............ A01D 34/4161 30/276 |
| 5,311,665 A * | 5/1994 | Sugihara ............ A01D 34/4162 30/276 |
| 5,345,683 A | 9/1994 | Kanou |
| 5,659,960 A | 8/1997 | Everts et al. |
| 5,671,536 A | 9/1997 | Everts et al. |
| 5,765,287 A | 6/1998 | Griffini et al. |
| 5,806,192 A | 9/1998 | Everts et al. |
| 5,809,655 A | 9/1998 | Houben et al. |
| 6,108,914 A | 8/2000 | Sheldon |
| 6,148,523 A | 11/2000 | Everts et al. |
| 6,385,853 B1 | 5/2002 | Berfield |
| 6,457,242 B1 | 10/2002 | Fogle |
| 6,854,185 B1 | 2/2005 | Alliss |
| 6,901,667 B2 | 6/2005 | Proulx |
| 6,952,877 B2 | 10/2005 | Pfaltzgraff |
| 7,257,898 B2 | 8/2007 | Iacona |
| 7,275,324 B2 | 10/2007 | Proulx |
| 7,412,768 B2 | 8/2008 | Alliss |
| 7,513,046 B2 | 4/2009 | Proulx |
| 7,581,322 B2 | 9/2009 | Proulx |
| 7,607,232 B2 | 10/2009 | Pfaltzgraff |
| 7,640,668 B2 | 1/2010 | Iacona |
| 7,762,002 B2 | 7/2010 | Proulx |

(Continued)

*Primary Examiner* — Sean Michalski
*Assistant Examiner* — Fernando Ayala
(74) *Attorney, Agent, or Firm* — Wegman, Hessler & Vanderburg

(57) ABSTRACT

A spool for a trimmer head has a structure for guiding a pair of separate trimmer line pieces through a core of the spool. The spool includes separate trimmer line channels formed through the core, each channel receiving one of the trimmer line pieces. A spool cover is positionable adjacent to the spool to enclose the channels. The spool cover includes a pair of cantilever springs extending therefrom for releasably securing the trimmer line pieces within the channels.

16 Claims, 18 Drawing Sheets

(56) References Cited

U.S. PATENT DOCUMENTS

| | | |
|---|---|---|
| 7,797,839 B2 | 9/2010 | Proulx |
| 7,882,642 B2 | 2/2011 | Proulx |
| 7,979,991 B2 | 7/2011 | Pfaltzgraff |
| 8,001,694 B2 | 8/2011 | Sing et al. |
| 8,230,602 B2 | 7/2012 | Arnetoli |
| 8,266,805 B1 * | 9/2012 | Alliss ................. A01D 34/4163 30/276 |
| 8,307,558 B2 | 11/2012 | Alliss |
| 8,429,886 B2 | 4/2013 | Kato et al. |
| 8,464,431 B2 | 6/2013 | Reynolds et al. |
| 8,510,960 B2 | 8/2013 | Pfaltzgraff et al. |
| 2006/0254060 A1 | 11/2006 | Alliss |
| 2006/0254061 A1 | 11/2006 | Alliss |
| 2008/0053052 A1 | 3/2008 | Cigarini |
| 2008/0271424 A1 | 11/2008 | Alliss |
| 2009/0172955 A1 * | 7/2009 | Morris ................ A01D 34/4163 30/276 |
| 2009/0260237 A1 | 10/2009 | Alliss |
| 2010/0154229 A1 | 6/2010 | Iacona |
| 2010/0180451 A1 * | 7/2010 | Reynolds ............ A01D 34/4163 30/276 |
| 2011/0000091 A1 | 1/2011 | Proulx |
| 2011/0239468 A1 | 10/2011 | Conlon |
| 2011/0302793 A1 | 12/2011 | Alliss |
| 2012/0000079 A1 | 1/2012 | Arnetoli |
| 2012/0131805 A1 | 5/2012 | Kato et al. |
| 2012/0255182 A1 | 10/2012 | Kato |
| 2012/0272535 A1 | 11/2012 | Arnetoli |
| 2013/0283623 A1 * | 10/2013 | Pellenc ................. A01D 34/416 30/276 |
| 2014/0360026 A1 * | 12/2014 | Yamaoka ............ A01D 34/4163 30/276 |
| 2015/0121707 A1 * | 5/2015 | Li ...................... A01D 34/4161 30/276 |
| 2015/0223395 A1 * | 8/2015 | Pellenc .............. A01D 34/4161 30/276 |
| 2016/0106034 A1 * | 4/2016 | Arnetoli ............. A01D 34/4166 30/276 |

* cited by examiner

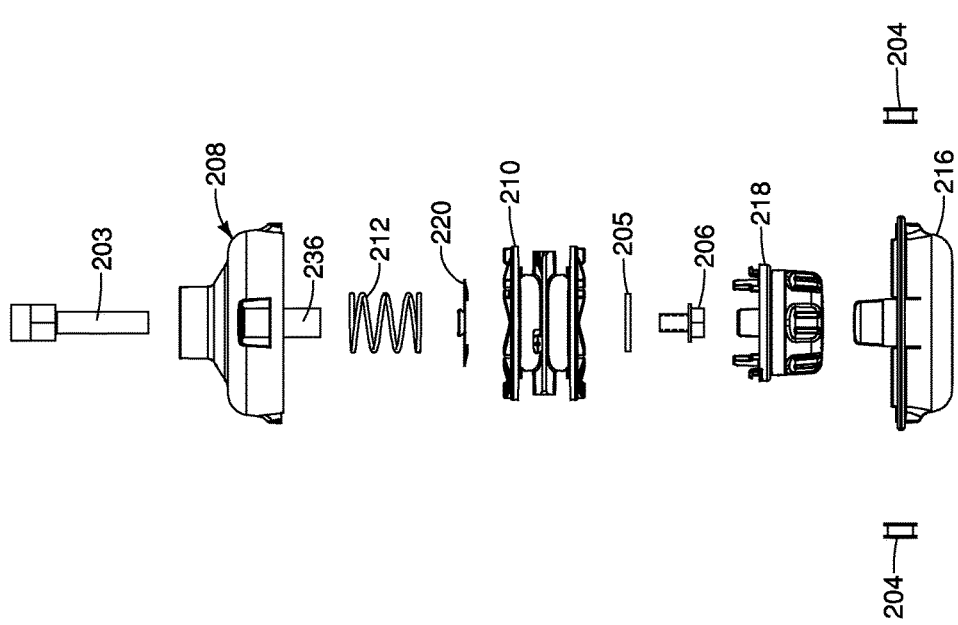

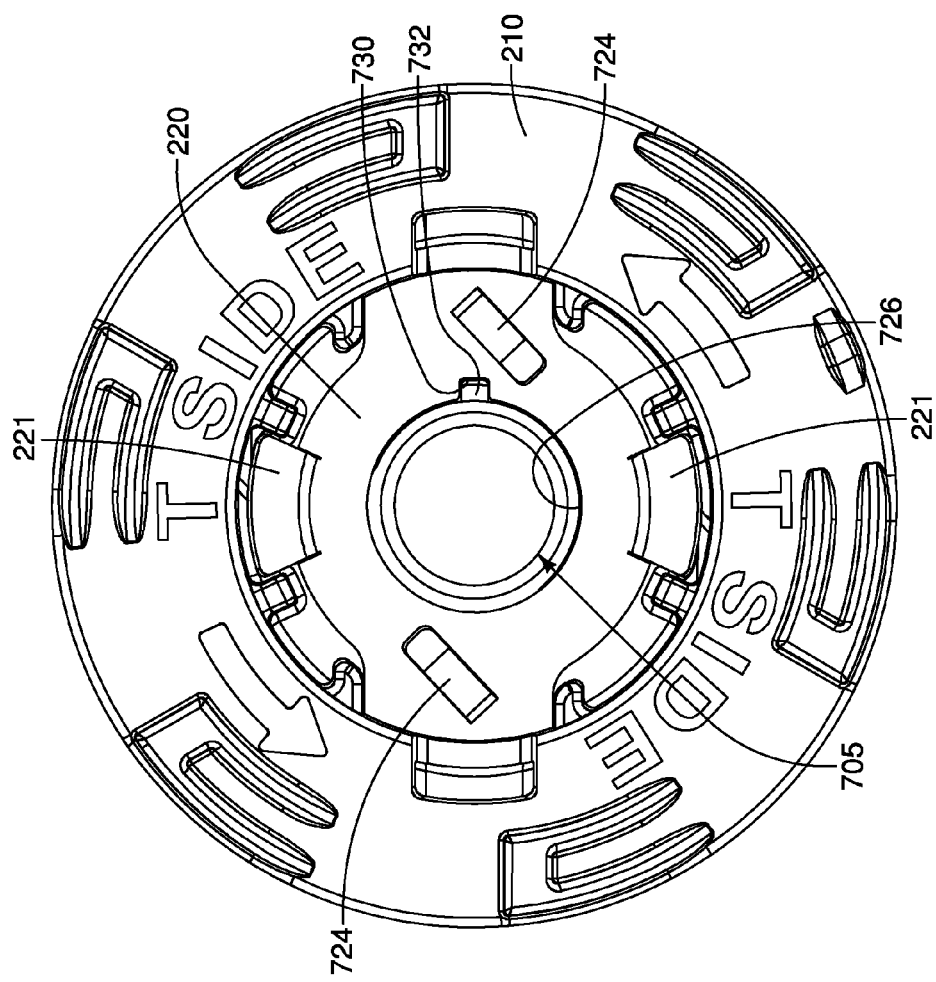

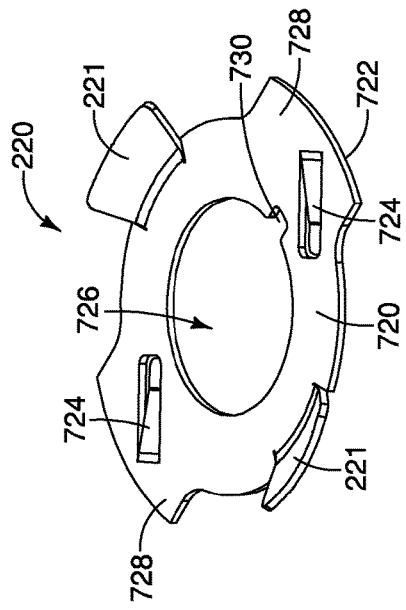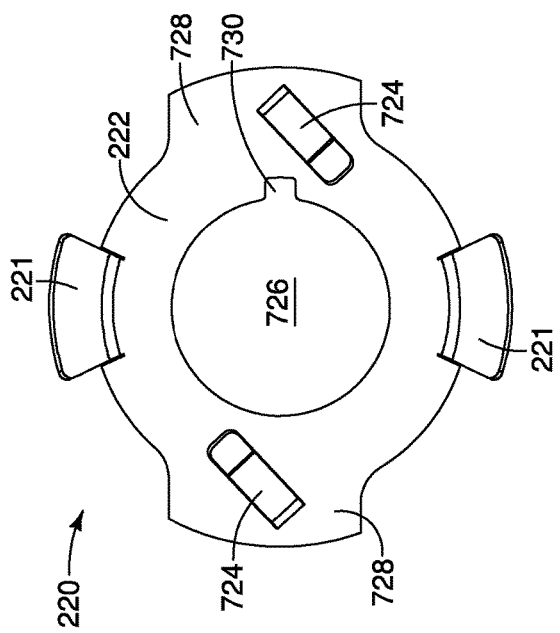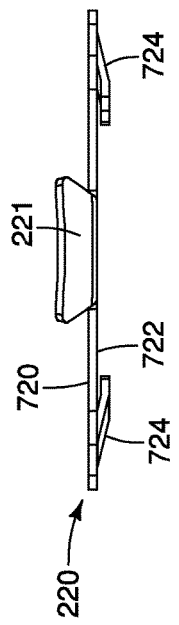

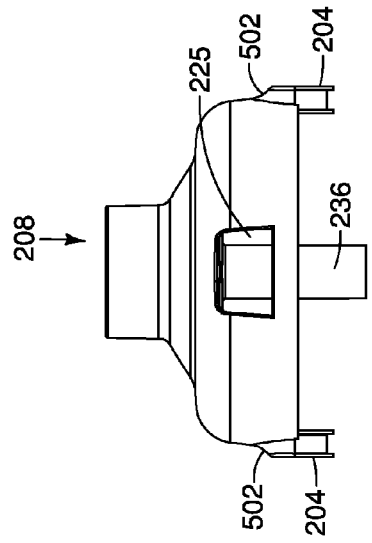
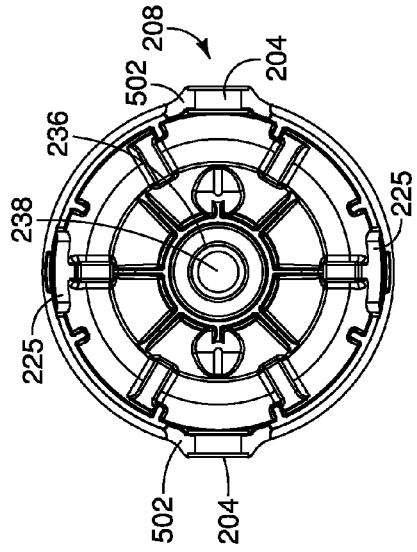
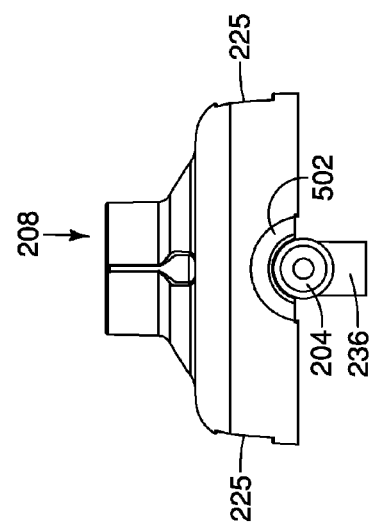
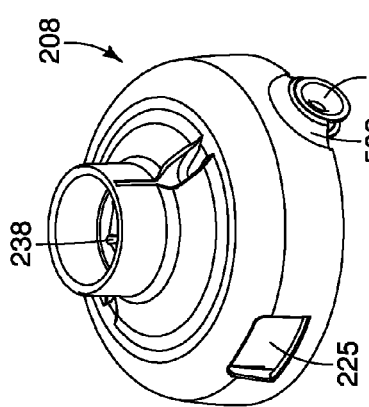
Fig. 10A
Fig. 10B
Fig. 10C
Fig. 10D

TRIMMER HEAD

FIELD OF THE INVENTION

The invention relates generally to trimmer heads for handheld lawn maintenance tools, and more particularly to string trimmer heads.

BACKGROUND

Internal combustion engine and electric motor powered string trimmers are commonly used to cut and trim grass, weeds, brush and other vegetation. The typical motorized trimmer may include an elongated handle to which is connected an internal combustion or electric motor that rotatably drives a trimmer head located at a distal end of the handle. This machine is often referred to as a "handheld" tool.

The trimmer head (e.g., a rotary cutting head attachment to a driveshaft of a trimmer), in turn, carries radially outwardly projecting cutting implements, which cut the vegetation as the trimmer head rotates. In addition to "handheld" vegetation cutting machines there are also wheeled type string trimmers, which are gas powered, and utilize an engine that generates much greater horsepower than any "handheld" type machine, the trimmer and cutting machines are designed to cut very dense (e.g., thick) vegetation and brush. These trimmer machines use some types of cutting heads that are used with the "handheld" trimmer machines.

The trimmer head may include one or more flexible monofilament line or rigid cutting implements. The monofilament lines are often wrapped around a spool located within the trimmer head. Repair or re-filling of the monofilament line-wrapped spool usually involves disassembling the trimmer head, removing the spool and either repairing or otherwise fixing the line to allow it to unspool properly or re-winding the spool with a new amount of line. This process is tedious and often time-consuming as the elasticity and resistance of the line to remain wound makes these tasks difficult.

Generally, weeds growing on footpaths between rice fields etc. have to be cut several times a year because they tend to be nested by pests. The weed cutting is usually very laborious, and thus various automatic weed cutters have heretofore been proposed and put to practical use, among which shoulder-hung weed cutters are very popular because of their small size and handling ease. In most of the shoulder-hung weed cutters, a driving-force transmission shaft or driveshaft, which is passed through a pipe-shaped handling rod, is rotated via an engine provided at one end of the handling rod so as to rotate a cutting or trimmer head provided at the other end of the handling rod.

In most cases, a human operator hangs the weed cutter on his or her shoulder using a hanging belt, and cuts weeds with the rotating cutter blade or monofilament line by gripping a U-shaped handle provided on an intermediate position of the handling rod to swing the handling rod in front-and-rear and left-and-right directions.

Both in light duty, medium and heavy duty gas and electric powered trimmers, the cutting implements may be fabricated as a continuous strand flexible monofilament plastic line wrapped about a spool contained within the trimmer head. In such devices, the plastic line is typically selectively dispensed by the centrifugal force generated by rotation of the trimmer head.

A disadvantage common to these sorts of devices is that the line quite frequently becomes jammed when a user attempts to dispense fresh line from the spool and the line prematurely breaks off at the eyelet because the diameter of the line is small and has little tensile strength when making contact with hard objects and heavy vegetation. When this occurs, the user generally must stop the trimming operation, disassemble the trimmer head, fix the jam and or extend line through the eyelets and reassemble the trimmer head before resuming trimming. Such repeated disruption is very frustrating and time-consuming by the end user. It should be noted that spool heads of automatic and semi-automatic type, include a line cutting blade on the debris shield. When the head is bumped on the ground and dispenses the line, more line is generally extended from the storage spool than needed, and the blade on the shield cuts off the extra line.

BRIEF SUMMARY OF THE INVENTION

In one aspect of the present invention, a trimmer head is provided. The trimmer head includes a spool having a core, a central flange oriented substantially perpendicular to the core wherein a portion of the central flange is located within the core, a pair of outer flanges extending radially outward from the core and in which each of the outer flanges is spaced apart from an opposing side of the central flange, an upper channel located between one of the outer flanges and the central flange, a lower channel located between the other of the outer flanges and the central flange, a central aperture formed through the portion of the central flange located within the core, and a pair of trimmer line channels formed into the portion of the central flange located within the core. One of a pair of trimmer lines is receivable within each of the trimmer line channels and is windable into one of the upper or lower channels. The trimmer head also including a spool cover having a plate and a pair of cantilevered springs extending at an angle from the plate. The spool cover is positionable immediately adjacent to the portion of the central flange located within the core. Each of the springs extending into one of the trimmer line channels of the spool. The trimmer head further including a knob releasably attachable to the spool, wherein the spool cover is securable between the knob and the spool. The trimmer head also including an upper housing and a lower housing. The lower housing is attachable to the upper housing to form a casing, wherein the spool, spool cover, and said knob are positioned between the upper and lower housings. The casing includes a pair of opposing eyelets for receiving the pair of trimmer lines.

In another aspect of the present invention, a trimmer head is provided. The trimmer head includes a spool having a core, a central flange oriented substantially perpendicular to the core wherein a portion of the central flange is located within the core. A central aperture is formed through the portion of the central flange located within the core. A pair of trimmer line channels are formed into the portion of the central flange located within the core. A pair of pathways are formed into the central flange extending from an outer peripheral edge of the central flange to the core wherein each of the pathways connects to an end of one of the trimmer line channels. A pair of sidewall openings are formed through said core wherein each of the sidewall openings connects to one of the trimmer line channels at an end opposite to the corresponding pathway, wherein each of a pair of trimmer lines is extendable through the spool along one of the pathways, the corresponding trimmer line channel, and the corresponding sidewall opening. The trimmer head further including a spool cover having a plate and a pair of cantilevered springs extending at an angle from the plate. The spool cover is positionable immediately adjacent to the portion of the central flange located within the core. Each of the springs extends into one of the trimmer line channels of the spool, wherein each of the pair of trimmer lines is releasably engageable by one of the springs when extending through the spool. A knob is releasably attachable to the spool, wherein the spool cover is securable between the knob and the spool. The trimmer head also includes an upper housing and a lower housing attachable to said upper housing to form a casing. The spool, spool cover, and the knob are positioned between the upper and lower housings. The casing has a pair of opposing eyelets for receiving the pair of trimmer lines.

Advantages of the present invention will become more apparent to those skilled in the art from the following description of the embodiments of the invention which have been shown and described by way of illustration. As will be realized, the invention is capable of other and different embodiments, and its details are capable of modification in various respects. Accordingly, the drawing(s) and description are to be regarded as illustrative in nature and not as restrictive.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 3 shows an exploded view of an embodiment trimmer head.

FIG. 8C shows a top view of the spool and spool cover.

FIG. 9A is a top perspective view of an embodiment of a spool cover.

FIG. 9B is a top view of the spool cover shown in FIG. 9A.

FIG. 9C is a side view of the spool cover shown in FIG. 9A.

FIG. 10A is a top perspective view of an embodiment of an upper housing.

FIG. 10B shows a side view of the upper housing shown in FIG. 10A.

FIG. 10C shows another side view of the upper housing shown in FIG. 10A.

FIG. 10D shows a bottom view of the upper housing shown in FIG. 10A.

DETAILED DESCRIPTION OF THE INVENTION

Figure 1:
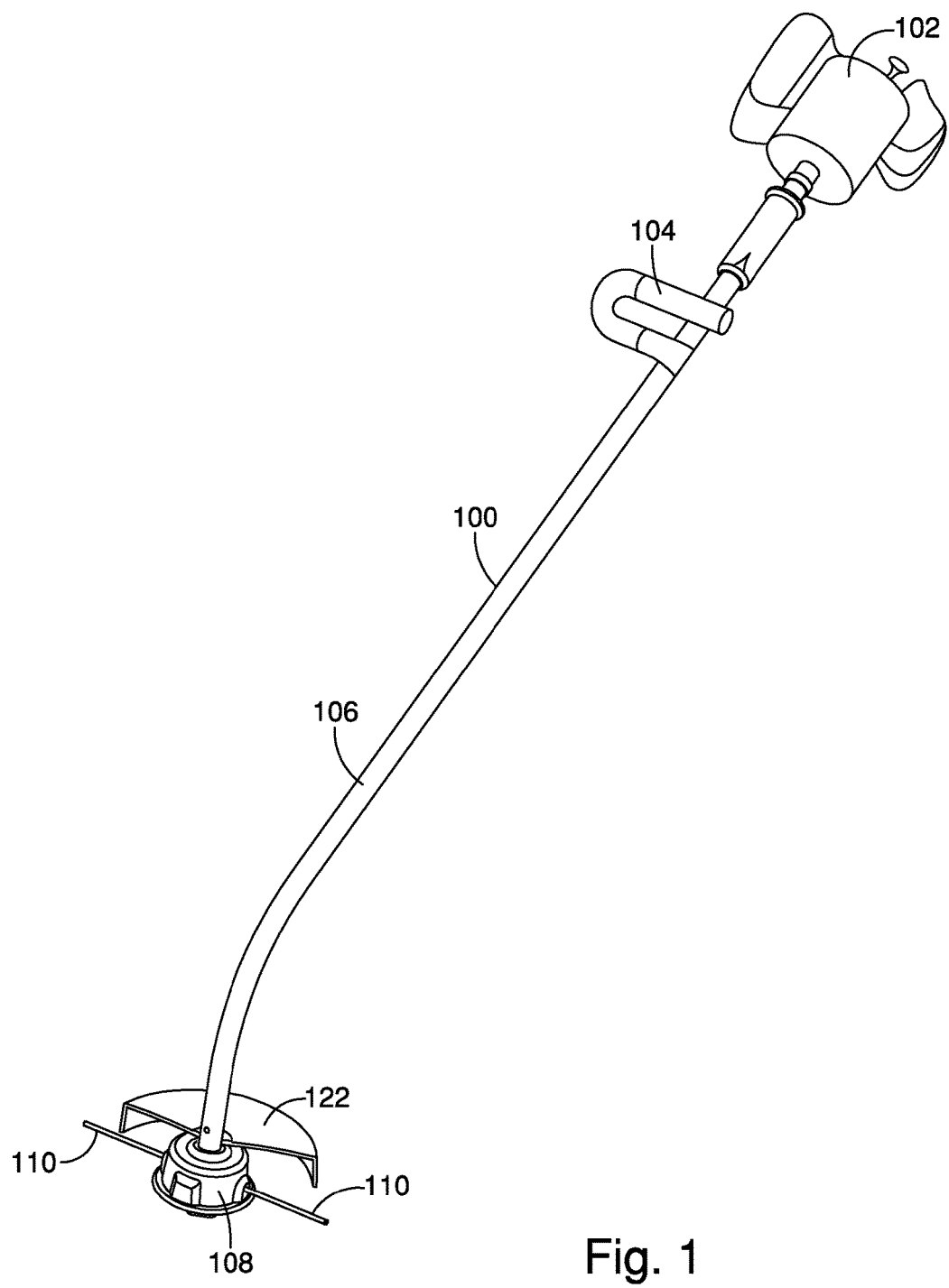
FIG. 1 is an illustration of an example of a string trimmer according to the present invention.

FIG. 1 is an illustration of an example of a string trimmer 100 according to the present invention. The string trimmer 100 may include a motor 102, a steering handle 104, a shaft 106, a trimmer head 108, a pair of trimmer lines 110, and an optional shield 122. In other embodiments, the string trimmer 100 may not have all of the elements listed and/or may have other elements instead of or in addition to those listed.

The string trimmer 100 may be a handheld device that is used for cutting vegetation or other material. The motor 102 powers the string trimmer 100. The motor 102 may be an electric motor, combustion engine, or another type of motor. The steering handle 104 may be used for holding, guiding, and directing the string trimmer 100. The shaft 106 may also be used for holding the string trimmer 100. The shaft 106 may be hollow and, within the hollow portion, the shaft 106 may contain a mechanical connection (which may be referred to as the driveshaft) coupling the motor 102 to a trimmer head 108. The trimmer head 108, as will be described below, is a bi-directional spool trimmer head that does not require disassembly of the trimmer head components prior to reloading new trimmer line onto the enclosed storage spool. The bi-directionality of the trimmer head 108 means that the spool located within the trimmer head can be positioned within the housing in two different orientations, as will be discussed below.

The trimmer head 108 is attached to a distal end of the shaft 106, as shown in FIG. 1. The trimmer head 108 may be used with other types of trimmers other than string trimmers. For example, although string trimmer 100 is illustrated as a handheld machine, an embodiment of a trimmer head 108 may also be used on a wheeled trimmer machine.

The trimmer head 108 may hold one or more trimmer lines 110, and the trimmer head 108 is configured to rotate at a fast enough speed to allow the portion(s) of the trimmer lines extending from the trimmer head 108 to cut vegetation. The trimmer lines 110 may be formed as a nylon wire or other type of wire. It should be understood by one having ordinary skill in the art that that the term "trimmer line," as used herein may mean any single- or multi-filament line having sufficient flexibility to be wound onto a spool. As the trimmer head 108 spins, the ends of the trimmer lines 110 tend to extend radially outward as a result of the centrifugal force. In an embodiment, the trimmer lines 110 may be any of a wide range of both different sizes (e.g., 0.047" to 0.160" in diameter) and of different shapes, such as round or non-round cross sections (e.g., square, octagon, hexagon, diamond, or oval). For example, trimmer line pieces 110 may be any trimmer line constructed as a flexible yet rugged filament, string, or wire. In an embodiment, trimmers line 110 may be any of the commercially available flexible monofilament plastic trimmer lines of any suitable type and cross-sectional configuration, such as 0.065", 0.080", 0.095", 0.105", 0.12", 0.130" or 0.155" gauge nylon trimmer line or the like, which is currently used as cutting filament in a conventional string trimmer.

The shield 122 is optional. The shield 122 is configured for operator safety. The shield 122 assists in protecting the operator from flying debris that may be kicked up by the ends of the trimmer lines 110.

In an embodiment, the trimmer head 108 is a fixed line trimmer head for flexible line trimmers that does not require disassembly, which can be easy and quickly loaded as well as easily and quickly unloaded without the use of a separate tool. In an embodiment, the trimmer head 108 is a fixed line trimmer head for flexible line rotary trimmers that simplifies both easy line loading and unloading of trimmer line while providing a tight securement of the line to the head. In an embodiment, the trimmer head 108 includes a simplified trimmer line removal, and the trimmer head 108 is of simple construction and is economical to manufacture. In an embodiment, the trimmer head 108 is used with flexible trimmer lines and enables easy trimmer line removal and replacement and is adapted for use in cutting heavy brush. In an embodiment, the trimmer head 108 is used with a flexible line rotary trimmer that has a simplified easy line removal and replacement while providing a tight securement of the line to the head independent of the rotational velocity of the head and is adaptable for use with cutting line of a wide variety of diameters as well as round and non-round shapes.

In an embodiment, the trimmer head 108 is used with a flexible line rotary trimmer that has a simplified line removal and replacement without the need for any disassembly and reassembly of trimmer housing parts while replacing the trimmer line. In an embodiment, the trimmer head 108 is used with flexible line rotary trimmers, which are more durable than known arrangements, and reduce (e.g., minimizes) wear on the string during operation. In an embodiment, the trimmer head 108 is used with flexible line rotary trimmers that can be used on the majority of gas and electric manufactured handheld, wheeled, vegetation, and brush cutting machines (e.g., multi-fit) and is for use by both home users or commercial users. In an embodiment, the trimmer head 108 is used with flexible line rotary trimmers, which enables both easy loading and unloading of trimmer line while providing a tight securement of the trimmer line to the trimmer head 108. The tightness of the securement of trimmer head to the trimmer line may be dependent on the rotational velocity of the head. In an embodiment, the trimmer head 108 includes a "one way" gripping device that secures the trimmer line within the trimmer head during the refilling process.

Figure 2A:
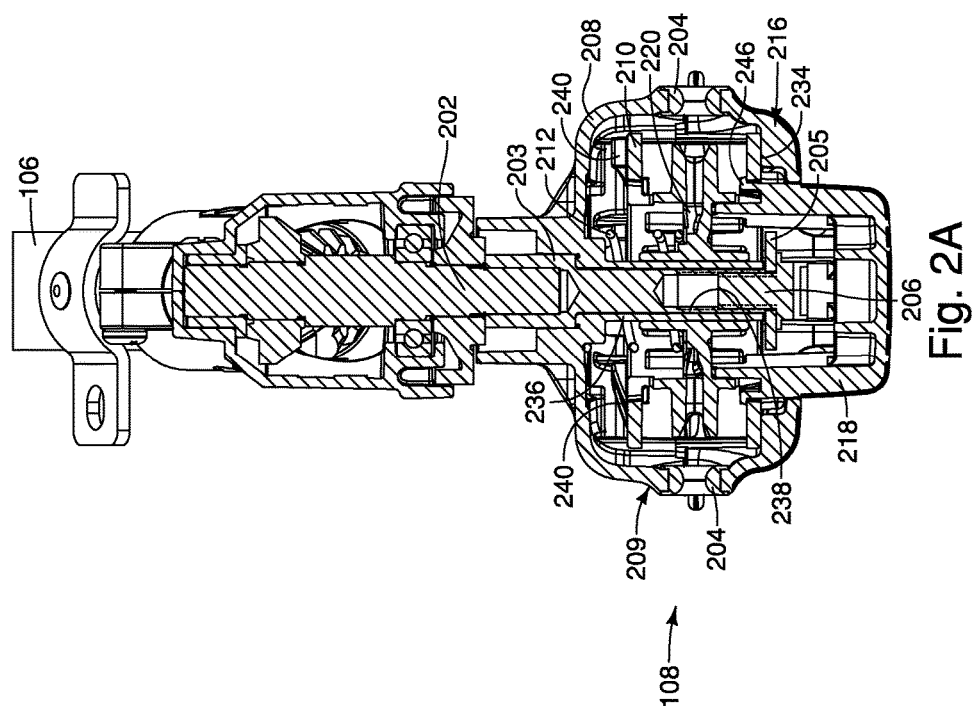
FIG. 2A shows a cross section of an embodiment of a portion of the string trimmer having the trimmer head.

FIG. 2A shows a cross section of an embodiment of a portion of a string trimmer 100 with the trimmer head 108 attached to the shaft 106. The trimmer head 108 includes a pair of eyelets 204, a fastener 206, an upper housing 208, a spool 210, a biasing mechanism 212, a lower housing 216, a knob 218, and a spool cover 220. In other embodiments, the trimmer head 108 may not have all of the elements listed and/or may have other elements instead of or in addition to those listed. In this and other embodiments, the trimmer head 108 may include additional elements that are not listed.

FIG. 2A shows a cross section view of an embodiment of a trimmer cutting head 108, which may be used for cutting vegetation in conjunction with an internal combustion engine or electric motor powered trimmer apparatus and which may be referred to as a handheld grass and/or weed trimmer or brush cutting machine.

FIG. 2A is cross section view of the fully assembled trimmer head 108 operatively connected to a driveshaft 202 which passes vertically through the center of the spool 210. The driveshaft 202 is attached to shaft 106 and is also attached to a portion of the trimmer head 108, so that the trimmer head 108 spins when the driveshaft 202 spins. The eyelets 204 are used for threading a pair of trimmer line pieces 110 pieces into the trimmer head 108 while helping to guide the trimmer line pieces 110 pieces into the trimmer head 108. In the illustrated embodiment, each eyelet 204 is configured to receive a separate piece of trimmer line pieces 110. The trimmer lines 110 pieces passes through the eyelets 204 when loading the trimmer line pieces 110 pieces into, and discharging the trimmer line pieces 110 from, the trimmer head 108. The eyelets 204 are located at diametrically opposed locations on the housing of the trimmer head 108. The eyelets 204 are provided with a gently curved contour to reduce breakage of the trimmer line during operation of the trimmer head 108.

The fastener 206 is used to attach the main housing body to the driveshaft 202. In an embodiment, the fastener 206 is a bolt or nut. In an embodiment, the fastener 206 is threaded. As shown in FIG. 2A, the fastener 206 is inserted through an aperture in an inwardly-directed the projection 236 of the upper housing 208, and the fastener 206 is threadingly engaged with the end of the driveshaft 202. In an embodiment, a portion of the upper housing 208 is positioned between the fastener 206 and the driveshaft 202 so as to be fixedly attach the upper housing 208 to the driveshaft 202. In the illustrated embodiment, a secondary connector 203 extends through the projection 236, wherein the secondary connector 203 is threaded onto the drive shaft 202 and a washer 205 is positioned between the fastener 206 and the secondary connector 203. This fixed connection allows the rotation of the driveshaft 202 to be transferred to the upper housing 208. It should be understood by one having ordinary skill in the art that although it is a fixed connection between the upper housing 208 and the driveshaft 202, the fastener 206 can be removed to allow the upper housing 208 to be disconnected from the driveshaft 202.

The casing 209 of the trimmer head 108 is formed of the upper housing 208 and a lower housing 216, as shown in FIGS. 2-3. In the illustrated embodiment, the upper and lower housings 208, 216 are snappingly engaged to each other by way of a pair of opposing cantilevered the tabs 224 extending from the lower housing 216 that are received in corresponding apertures that are formed in the upper housing 208. It should be understood by one having ordinary skill in the art that the upper and lower housings 208, 216 can be removably attached to each other using any mechanical fastening mechanism(s).

The trimmer head 108 further includes a spool 210 for carrying the trimmer line pieces 110 that are rotatably supported within the casing 209. The biasing mechanism 212 is positioned between the spool 210 and the upper housing 208 and is configured to bias the spool 210 into a position in which the trimmer line pieces 110 are not discharged during operation. During operation, pushing the spool 210 in the opposite direction of the bias moves the spool 210 into a position in which the trimmer line pieces 110 are releasable. In an embodiment, the biasing mechanism 212 pushes the spool 210 away from the upper housing 208 towards the lower housing 216 of the trimmer head casing 209. In an embodiment, the biasing mechanism 212 presses the spool 210 into engagement with a portion of the trimmer head 108 that prevents the spool 210 from rotating with respect to the trimmer head 108, and thereby prevents the trimmer line pieces 110 from being released.

In the exemplary embodiment illustrated in FIGS. 2A-3 and 6A-6E, the spool 210 includes a core 226 about which the trimmer line pieces 110 may be wrapped. In an embodiment, the spool 210 has a pair of outer flanges 228 at opposite ends of the core 226 and a central flange 230 extending substantially perpendicular to the core and located about midway between the outer flanges 228, wherein the flanges 228, 230 facilitate keeping the trimmer line pieces 110 wrapped around the spool 210. A portion of the central flange 230 extends radially outward from the core 226, and a portion of the central flange 230 is located within the core 226.

As shown in FIGS. 2A-3 and 6A-6E, the outer flanges 228 and the central flange 230 form an upper the pathway 232a and a lower the pathway 232b, wherein the channels 214 are defined by the outer circumferential surface of the core 226, one of the outer flanges 228 and the central flange 230. In an embodiment, a pair of trimmer line pathways 232a, 232b are formed into the central flange 230, wherein the pathways 232a, 232b are generally disc-shaped and attached to the middle of the core 226 of the spool 210. The pathways 232a, 232b are positioned at diametrically opposite locations of the central flange 230, and the pathways 232a, 232b extend radially outward from the core 228 to the outer circumferential edge of the central flange 230. The pathways 232a, 232b are alignable with the eyelets 204, wherein the pathways 232a, 232b are configured to receive the trimmer line pieces 110 such that the trimmer line pieces extend from an eyelet 204 into the core 226 while passing through one of the pathway 232a, 232b. When loading trimmer line pieces 110 into the trimmer head 108, the upper and lower channels 214 receive the pieces of trimmer line pieces 110 after the trimmer line pieces 110 have been threaded through one of the eyelets 204.

The lower housing 216 forms a lower portion of the casing 209, as shown in FIGS. 2A-3. In other words, the trimmer head 108 may include a rigid molded plastic first or "top" portion, the upper housing 208, and a rigid molded plastic second or "bottom" portion, the lower housing 216. Together, the upper housing 208 and the lower housing 216 are referred to herein as the casing 209 of the trimmer head 108 or as the trimmer head housing. The upper housing 208 and the lower housing 216 may be releasably fastened to one another by a snap, threads, a J-slot, or other releasable connection. In an embodiment, the eyelets 204 are securely mounted between the upper and lower housings 208, 216 at diametrically opposed locations with respect to the casing 209. In an embodiment, the biasing mechanism 212 presses the spool 210 into engagement with a rib 234 (FIG. 5A) of the lower housing 216, which prevents the spool 210 from rotating relative to the casing 209 during rotation of the trimmer head 108.

The knob 218 is turnable to load the trimmer line pieces 110 onto the spool 210. If the knob 218 is pushed inwardly during operation (rotation of the trimmer head 108), the spool 210 is rotatable relative to the casing 209 to allow a portion of the trimmer line pieces 110 to be released or otherwise unspooled and allowed to be fed out the eyelets 204. Pushing the knob 218 inwards releases the spool 210 from being in engagement with the ribs 234 of the lower housing 216, thereby allowing the spool 210 to rotate with respect to the lower housing 216.

In an embodiment, the projection 236 of the upper housing 208 is a cylindrical extension, wherein the projection receives the secondary connector 203, as shown in FIGS. 2A-3. The projection 236 includes a central aperture 238 that is an opening within the upper housing 208, via which the upper housing 208 is attached to the driveshaft 202. In an embodiment, the projection 236 is an extension that extends inwardly relative to the casing 209. In order to secure the upper housing 208 to the string trimmer 100, the fastener 206 (e.g., a bolt or a nut) is inserted through the central aperture 238 of the projection 236 of the upper housing 208 and is connected to the secondary connector 203 that is threadingly engaged with the driveshaft 202. In addition to receiving the secondary connector 203 that is attached to the driveshaft 202, the projection 236 may maintain the biasing mechanism 212 in stable orientation during operation of the trimmer head 108.

As shown in FIGS. 2A-3 and 6A-6E, the spool 210 further includes a plurality of the ramps 240 that are engageable with the plurality of ribs 234 extending inwardly from the lower housing 216. The ramps 240 are inclined members that positioned on the outwardly-directed surface of both of the outer flanges 228. The ramps 240 are oriented in a direction that is concentric relative to the core 226 of the spool 210. The raised portion of the ramps 240 are configured to contact a rib 234 extending inwardly from the lower housing 216 to prevent rotation of the spool 210 relative to the casing 209. In operation, as the spool 210 is pressed or otherwise moved toward the upper housing 208 (in a direction against the bias of the biasing mechanism 212), the ramps 240 disengage from the ribs 234, thereby allowing the spool 210 to be rotatable relative to casing 209 which allows a portion of the trimmer lines 110 to be fed out the eyelets 204. During loading of the trimmer lines 110 onto the spool 210, the spool 210 is rotated in the opposite direction such that a length of the trimmer line pieces 110 extending from each eyelet 204 is pulled into the casing 209 and wound onto the upper and lower channels 214. As the trimmer line pieces 110 are wound onto the spool 210, the base of the ramps 240 contact the ribs 234, wherein the ribs 234 slide up the ramps 240 (which pushes the spool 210 against the biasing mechanism 212) until the rib 234 slides over the raised portion of the ramp 240. As each rib 234 slides over the raised portion of a ramp 240, and audible click is heard by the user to indicate that the spool 210 is rotating and the trimmer line pieces 110 is being wound onto the spool 210.

One of the outer flanges 228 is located at one end of the core 226 of the spool 210, and the other outer flange 228 is located at another end of the spool 210 to facilitate wrapping the trimmer line pieces 110 around the spool 210. The outer flanges 228 may be circular and disc shaped bounding the placement of the trimmer line pieces 110. In an embodiment, the spool 210 also has a central flange 230 which divides the spool 210 into multiple channels 214 (that are open to the inside walls of the casing 209) or regions for storing the trimmer line pieces 110.

The ramps 240 may be located on outer flanges 228. In the embodiment illustrated in FIGS. 2A-3 and 6A-6E6A-6E, each ramp 240 may engage a depression in the inner surface of the lower housing 216 that prevents the spool 210 from rotating if the knob 218 is pressed inward against the biasing mechanism 212 during operation. Consequently, during operation the spool 210 may only release the trimmer line pieces 110 when the ramps 240 of the spool 210 are not contacting the ribs 234 of the lower housing 216, which limits how much the trimmer line pieces 110 is released during operation by tapping or bumping the bottom of the knob 218.

If the spool 210 is flipped over within the casing 209, and if the direction of rotation of motor 102 (and therefore of the driveshaft 202) is reversed, then the ramps 240 on the opposite outer flange 228 serve the same function as the ramps 240 serve in the current configuration (engaging the lower housing 216). Typically, available embodiments of a spool of trimmer head assemblies (in which the trimmer line may be wound onto a spool without disassembly of trimmer head housing, to reload trimmer line onto the inner spool) are "unidirectional" and can only function properly on a trimmer machine that turns the driveshaft in one specific direction (clock-wise or counter clockwise). In contrast, trimmer line the spool 210 shown in FIGS. 2A-3 and 6A-6E may be received in the trimmer head casing 209 with either of the outer flanges 228 in operative engagement with the inner surface of the lower housing 216. That is, the spool 210 may be selectively placed in a desired orientation in the lower housing 216 depending on the direction of rotation of the driveshaft 202 of the trimmer apparatus with which the trimmer head 108 is intended to be used. In another embodiment, the ramps 240 may be located on the lower housing 216 and the ribs 234 may be located on the outer flanges 228 of the spool 210.

The ramps 240 located on the outwardly-directed surface of both of the outer flanges 228 are oriented in the same direction. In other words, as viewed from the top (FIG. 6B) of the spool 210, all of the ramps are oriented such that the direction of the base to the raised portion is clockwise (and they would appear to be oriented counterclockwise if viewing the spool 210 from the opposite direction). As such, when the spool 210 is "turned over" (FIG. 6E) with respect to the configuration discussed above to allow the spool 210 to rotate in the opposite direction within the casing 209 due to the reverse rotation of the driveshaft 202, the ramps 240 can contact the upper housing 208 in order to prevent rotation of the spool 210 relative to the casing 209.

Figure 2B:
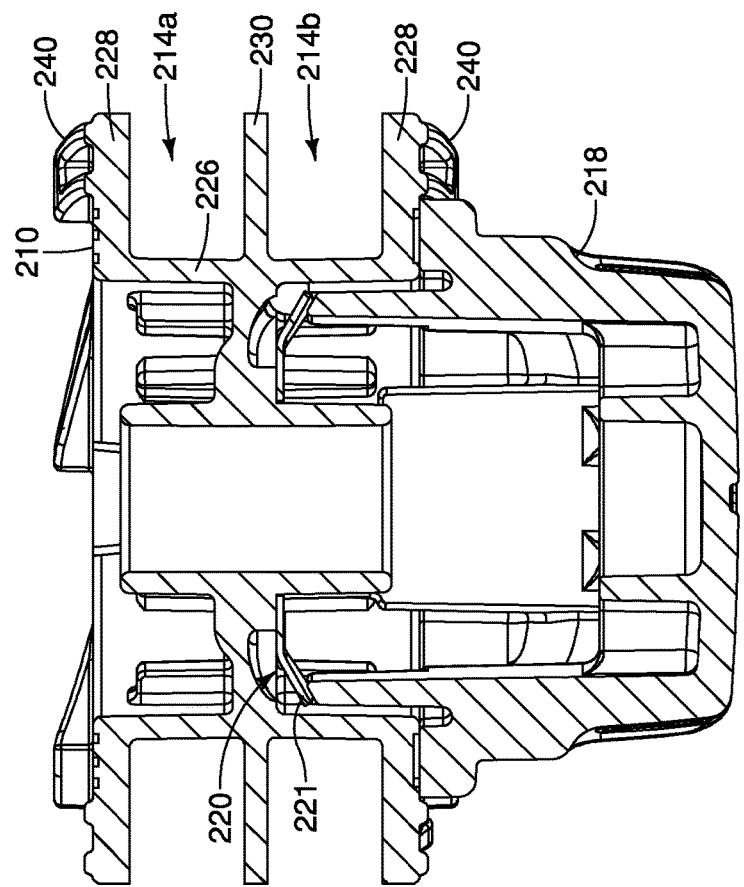
FIG. 2B shows a cross section of a portion of the trimmer head shown in FIG. 2A.

FIG. 2A shows a cross-sectional view of the spool 210, knob 218, and the spool cover 220 positioned between the biasing member 212 and the spool 210 in a "sandwiched" manner. This orientation of the spool 210 and spool cover 220 is opposite the orientation shown in FIG. 2B. The spool 210 includes ramps 240 located on both of the outer flanges 228. The central flange 230 is positioned between the outer flanges 228. The central flange 230 extends through the center of the core 216, whereas the outer flanges 228 extend from the outer radial circumferential surface of the core 216. The ramps 240 include a sloped top 716 and a stop face 714. The spool cover 220 is positioned immediately adjacent to the downwardly-directed surface of the portion of the central flange 230 located within the core 216. The spool cover 220 is locatable within the core 216 of the spool 210. In an embodiment, as shown in FIG. 2, the spool cover 220 is substantially planar with a pair of tabs 221 extending from opposing edges thereof, thereby allowing the spool cover 220 to be positively located against the spool 210. In the orientation shown in FIG. 2B, the knob 218 contacts the spool cover 220 to "sandwich" the spool cover 220 between the spool 210 and the knob 218. In the embodiment illustrated in FIG. 2A, the spool cover 220 is positively located against the spool 210 by the biasing mechanism 212 pressing against the spool cover 220 in order to press the spool cover 220 against the spool 210. The spool cover 220 includes a central aperture 726 for receiving the driveshaft 202 and the projection 236 of the upper housing 208.

FIG. 3 shows an exploded view of an embodiment of the trimmer head 108, having the secondary connector 203, the eyelets 204, the washer 205, the fastener 206, the upper housing 208, the biasing mechanism 212, the spool 210, the knob 218, the lower housing 216, and the spool cover 220. In other embodiments, the trimmer head 108 may not have all of the elements listed and/or may have other elements instead of or in addition to those listed.

The spool cover 220 covers one side of the spool 210, and is positionable between the spool 210 and the knob 218 in one orientation and between the spool 210 and the biasing mechanism 212 in the other orientation. In an embodiment, a pair of trimmer line channels 242 (FIG. 6B) are formed into the portion of the central flange 230 within the core 226. In an embodiment, the trimmer line channels 242 are open channels that become enclosed channels when the spool cover 220 is positioned immediately adjacent to the central flange 230, thereby covering the trimmer line channels 242.

FIG. 3 shows that the secondary connector 203 is placed through the top of the upper housing 208. The secondary connector 203 is secured to the upper housing 208 via the fastener 206, with the washer 205 positioned between the fastener 206 and the projection 236. The eyelets 204 are secured between the upper and lower housings 208, 216. The spool cover 220 is operatively secured to the spool, and the knob 218 is attached to the side of the spool 210 that is directed toward the lower housing 216.

In one orientation shown in FIG. 2B, the knob 218 is set resting on the tabs 221 of the spool cover 220 so as to secure the spool cover 220 between the knob 218 and the spool 210. As shown in the exemplary embodiment illustrated in FIGS. 2A-3 and 7, the knob 218 includes a pair of tabs 246 that are received in corresponding slots 248 (FIGS. 6B and 6E) in the spool 210 to removably attach the knob 218 to the spool 210. The biasing mechanism 212 is placed within the upper housing 208 and located about the projection 236, which pushes against the portion of the central flange 230 of the spool 210 located within the core 226, and then the upper housing 208 and the lower housing 216 are releasably fastened together to complete the assembly of the trimmer head 108.

Figure 4:
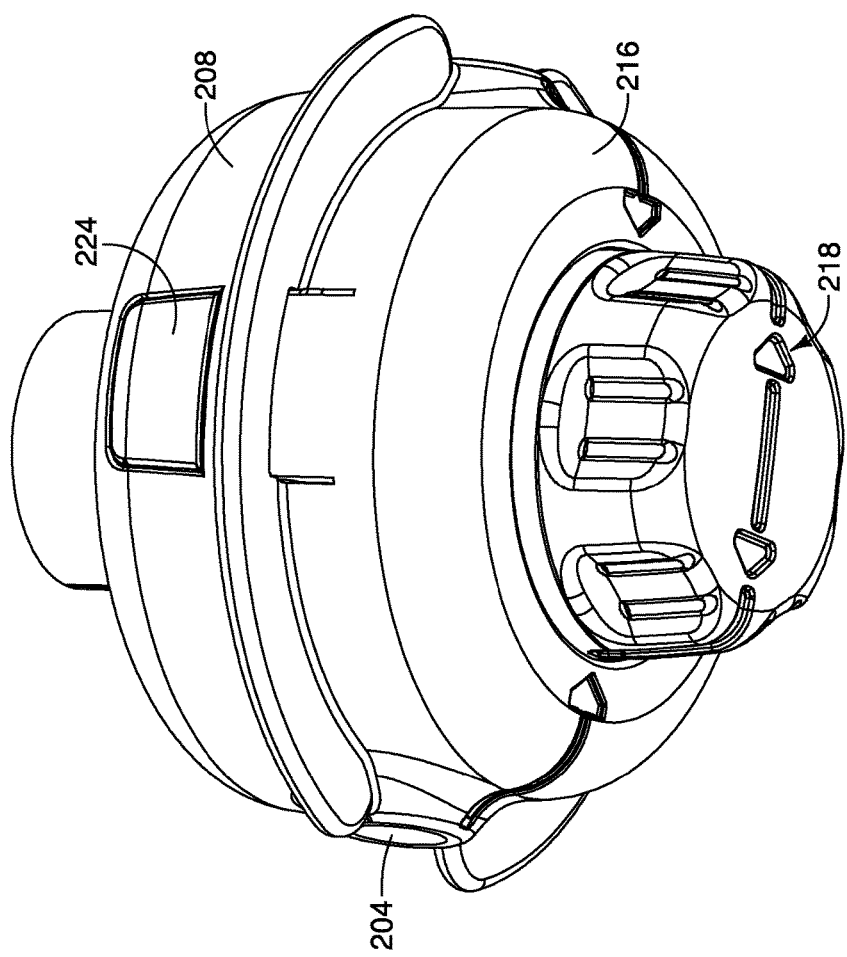
FIG. 4 shows a perspective view of an embodiment of the trimmer head.

FIG. 4 shows a perspective view of an embodiment of the trimmer head 108. Perspective view shows the eyelets 204, the upper housing 208, the lower housing 216, and the knob 218.

The eyelets 204, the upper housing 208, the lower housing 216, and the knob 218 illustrated in FIG. 4 were discussed above in conjunction with FIGS. 2A-3. The knob 218 protrudes through a circular opening formed in the lower housing 216. The tabs 224 of the lower housing 216 are attached to the upper housing 208 and engage the slots 225 on the side wall of the upper housing 208. The tabs 224 are an example of a fastener. The tabs 224 may be generally stiff yet resilient and project upward from the lower housing 216. The tabs 224 releasably attach the upper housing 208 to the lower housing 216. The tabs 224 are discussed below in conjunction with FIGS. 5A-5B. The grip 244 is the grip portion of the knob 218. The grip 244 is the portion of the knob 218 that the user grabs to turn the spool and line up the pathways 232 of the spool 210 with the eyelets 204 so that a new trimmer line pieces 110 piece can be inserted into each of the eyelets 204. The grip 244 is grasped by the user grips while turning the knob 218 to wind the trimmer line pieces 110 onto the spool 210.

Figure 5A:
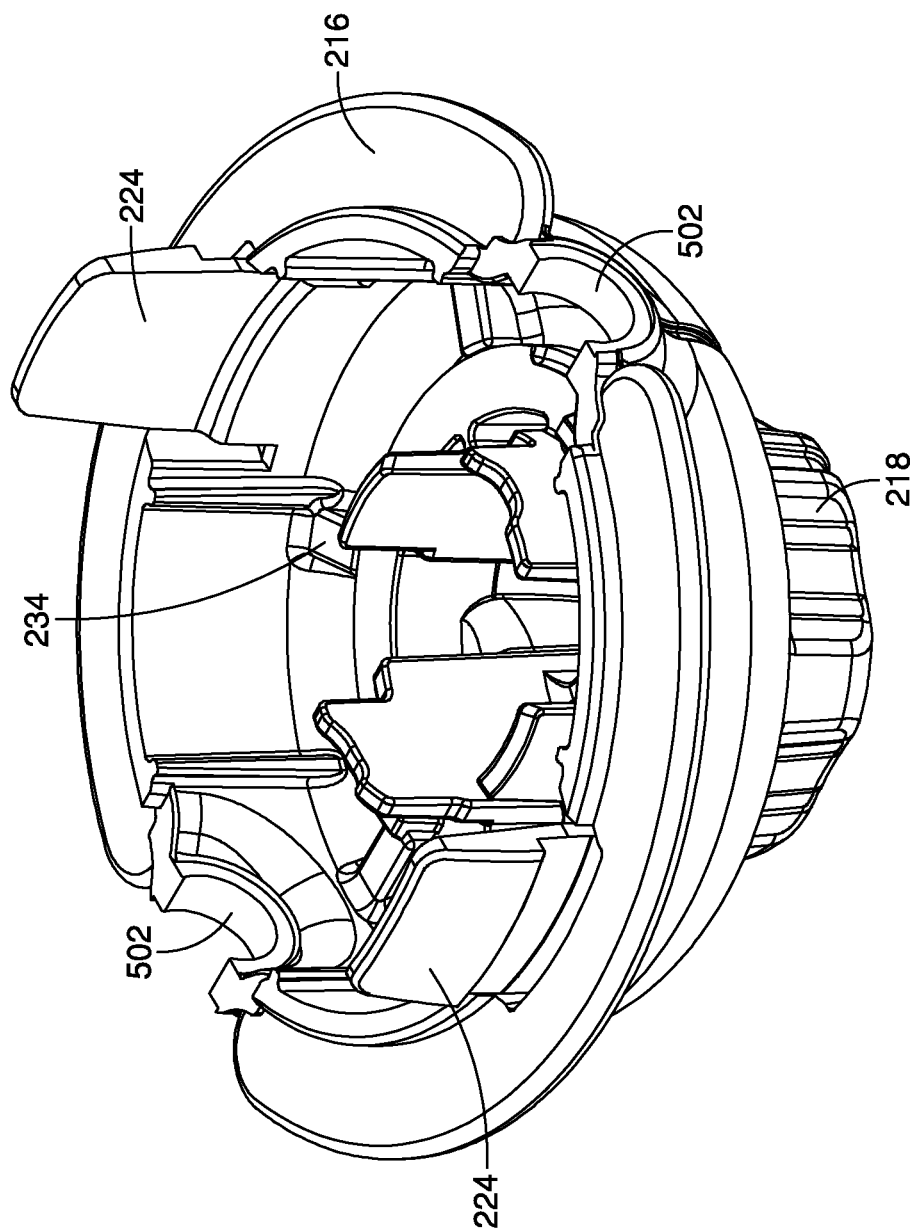
FIG. 5A shows a perspective view of an embodiment of the lower housing with the knob.
Figure 5B:
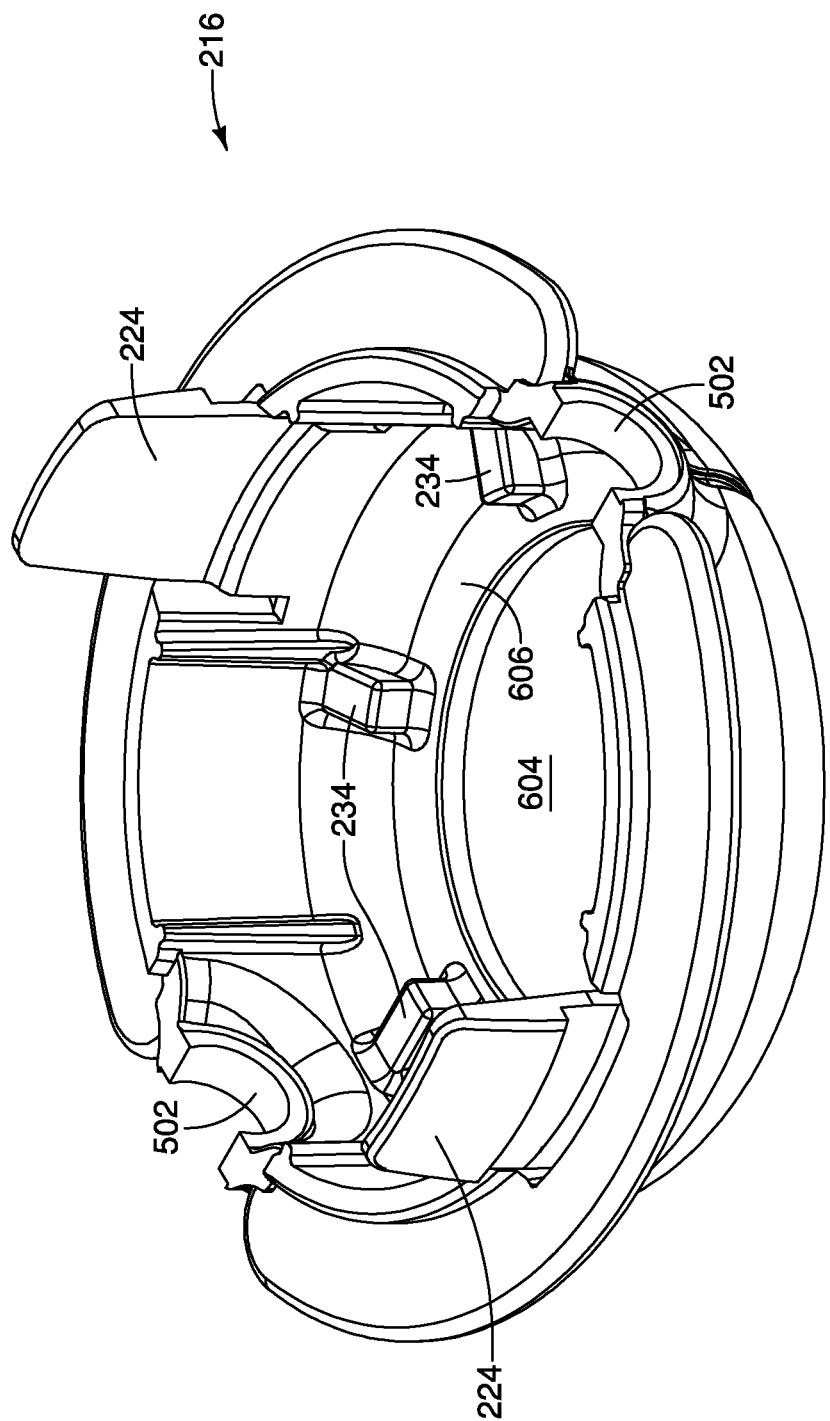
FIG. 5B shows perspective view of an embodiment of the lower housing.

FIGS. 5A-5B show an embodiment of the lower housing 216 having eyelet supports 502 and ribs 234. The knob 218 includes a shoulder that is seated within the lower housing 216 against the inner surface thereof, thereby allowing the grip 244 to extend outwardly from the lower housing 216.

The eyelet supports 502 support and hold the eyelets 204 (FIGS. 2 and 3) in place in the trimmer head 108 (FIGS. 1-3). The ribs 234 keep the spool 210 from rotating when the spool 210 is pushed against the lower housing 216 by the biasing mechanism 212. Between ribs 234 are depressions. The depressions, ribs 234, and ramps 240 form a latching mechanism that prevents the spool 210 from rotating when resting against the lower housing 216. The ribs 234 are projections that extend inwardly from the inner surface of the lower housing 216. The ribs 234 are oriented in a radial manner. The ribs 234 extend a distance enough to engage the raised portion of the ramps 240 to prevent rotation between the spool 210 and the lower housing 216 while not extending far enough to prevent the rotation of the spool 210 during loading of the trimmer line pieces 110 when rotated in the opposite direction.

FIG. 5B shows a perspective view of an embodiment of the lower housing 216 having the eyelet supports 502, the ribs 234, the central aperture 604, and the circular seat 606 against which the shoulder of the knob 218 rests.

As shown in FIG. 5B, the central aperture 604 is an aperture that is in the center of the lower housing 216 through which the knob 218 (FIGS. 2-3) protrudes. The circular seat 606 is an annular surface at the bottom of the lower housing 216. The circular seat 606 supports the knob 218 keeping the upper portion of the knob 218 within the casing 209 (FIG. 2).

Figure 6A:
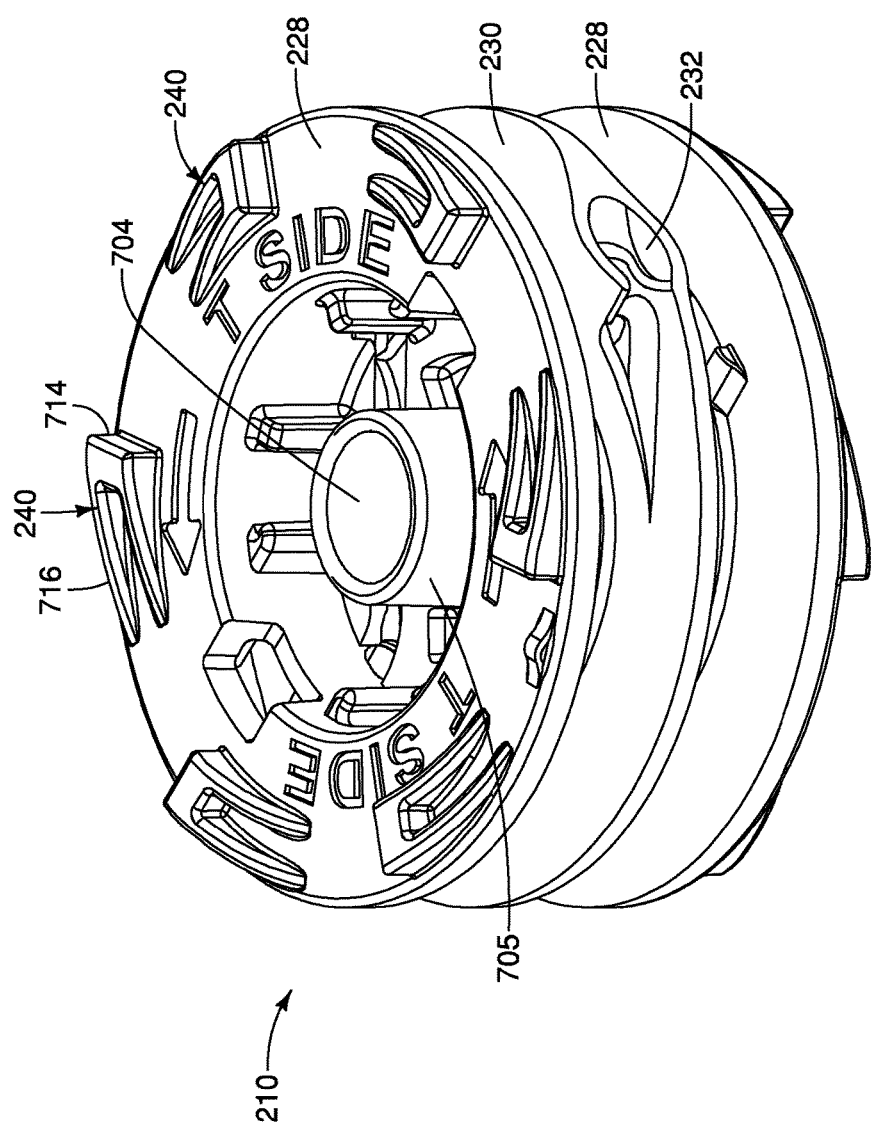
FIG. 6A shows a perspective view of an embodiment of the spool.

FIG. 6A shows a perspective view of an embodiment of the counterclockwise side of the spool 210 having a pathway 232, the ramps 240, the central opening 704, and the central flange 230. The ramps 240 have stop face 714 and arcuate, sloped top 716. In other embodiments, counterclockwise side the spool 210 may not have all of the elements listed and/or may have other elements instead of or in addition to those listed.

The central opening 704 receives the projection 236 of the upper housing 208 and allows the projection 236 to pass through the central opening 704 of the spool 210. In an embodiment, as shown in FIGS. 6C-6D, the spool 210 includes opposing sidewall openings 706 formed through the core 226 through which a piece of trimmer line exits the core 226. As one of the trimmer line pieces 110 is inserted into the spool 210 through one of the pathways 232, the piece of trimmer line 110 enters the core 226 and is received in the corresponding trimmer line channel 242 and follows the trimmer line channel 242 along the central flange 230 and exits the core 226 through a sidewall opening 706.

The central flange 230 provides the spool 210 with adjacent upper and lower channels 214, in which each receives a different piece of trimmer line pieces 110. The central flange 230 includes the pathway 232 (FIG. 2), which may be a portion of a passageway or channel that guides the trimmer line pieces 110 around the driveshaft 202. Stop face 714 of ramps 240 prevent the spool 210 from rotating in a direction that is opposite that of the arrow etched into the corresponding outwardly-directed surface of the outer flange 228 by latching a rib 234 extending from one of the upper or lower housing 208, 216. The sloped top 716 of the ramps 240 allow the spool 210 to rotate in the direction of the arrow etched into the corresponding outwardly-directed surface of the outer flange 228. The arc shape of sloped top 716 allows the ramps 240 to slide over and past a rib 234 extending from one of the upper or lower housing 208, 216.

FIGS. 6A-6E are various views of the spool 210 not attached to the knob 218 shown in FIG. 4. The spool 210, the pathway 232, and the ramps 240 were discussed in conjunction with FIG. 2. In FIGS. 6A-6E, the spool 210 has a counter-clockwise legend (etched directional marker) facing upwards, and will rotate counter-clockwise if oriented with the counter-clockwise legend facing up. The spool 210 similarly has a clockwise legend (etched directional marker) facing downward, and will rotate clockwise if oriented with the clockwise legend facing up. Additionally biasing mechanism 212 may rest on the spool 210 wrapped around the collar 705 that defines the central opening 704, which may maintain the biasing mechanism 212 in stable orientation during operation of the trimmer head 108.

Figure 6E:
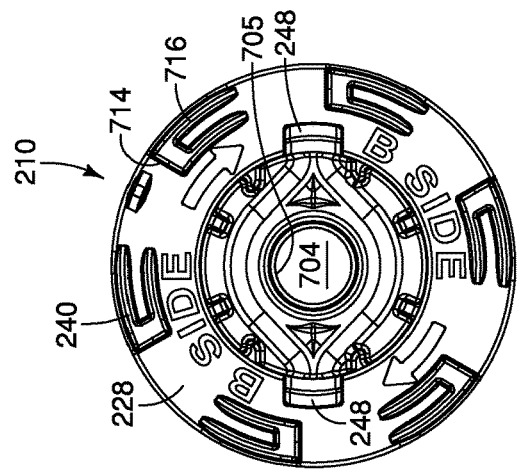
FIG. 6E shows a bottom view of the spool shown in FIG. 6A.
Figure 6C:
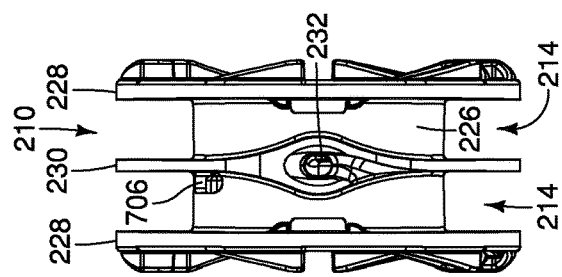
FIG. 6C shows a right side view of the spool shown in FIG. 6A.
Figure 6B:
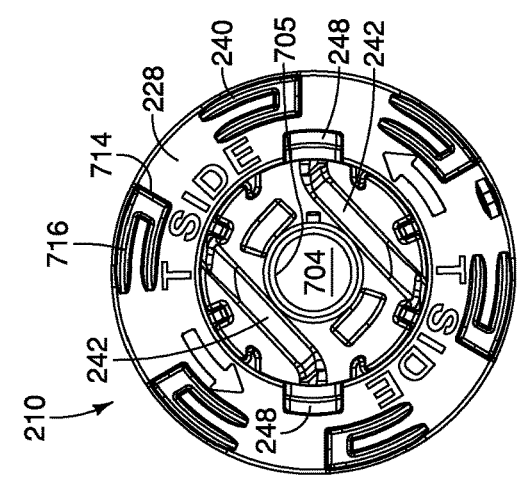
FIG. 6B shows a top view of the spool shown in FIG. 6A.
Figure 6D:
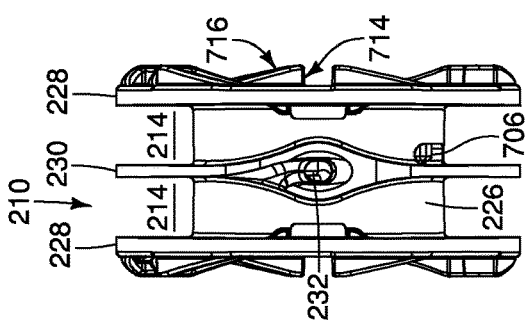
FIG. 6D shows a left side view of the spool shown in FIG. 6A.

FIGS. 6B and 6E show a pair of opposing slots 248 formed into the outer flange 228 for receiving the tabs 246 of the knob 218 to allow the knob 218 to be removably attachable to the spool 210. It should be understood by one having ordinary skill in the art that any mechanical attachment mechanism may be used to allow the knob 218 to be releasably attachable to the spool 210. It should also be understood by one having ordinary skill in the art that the knob 218 does not necessarily need to be directly attached to the spool 210. The tab-slot attachment between the knob 218 and the spool 210 allows the user-generated rotation of the knob 218 to be directly transferred into rotation of the spool 210, and the centrifugal rotation of the spool 210 may also be directly transferred into rotation of the knob 218 during a trimmer line-unwinding bump operation in which the knob 218 is tapped against the ground to disengage the spool 210 from the casing 209 to allow the spool 210 to rotate relative to the casing 209.

FIGS. 6A-6E also show a plurality of ramps 240 extending from the outwardly-directed surface of one of the outer flanges 228. Each ramp 240 includes a sloped top 716 as well as a stop face 714. The stop face 714 of the ramps 240 are configured to engage a rib 234 extending inwardly from the upper or lower housings 208, 216 to prevent rotation of the spool 210 relative to the casing 209.

The spool 210 includes a pair of opposing pathways 232 formed into the central flange 230. Each of the pathways 232 is configured to receive a separate trimmer line piece 110. The pathways 232 are formed as generally oval-shaped cross-sectional channels through the central flange 230 between the outer peripheral edge of the central flange 230 and the inner surface of the core 226. After each trimmer line piece 110 passes through the core 226, the end of the trimmer line piece 110 exits through a sidewall opening 706 formed into the opposing wall of the core 226.

Figure 7:
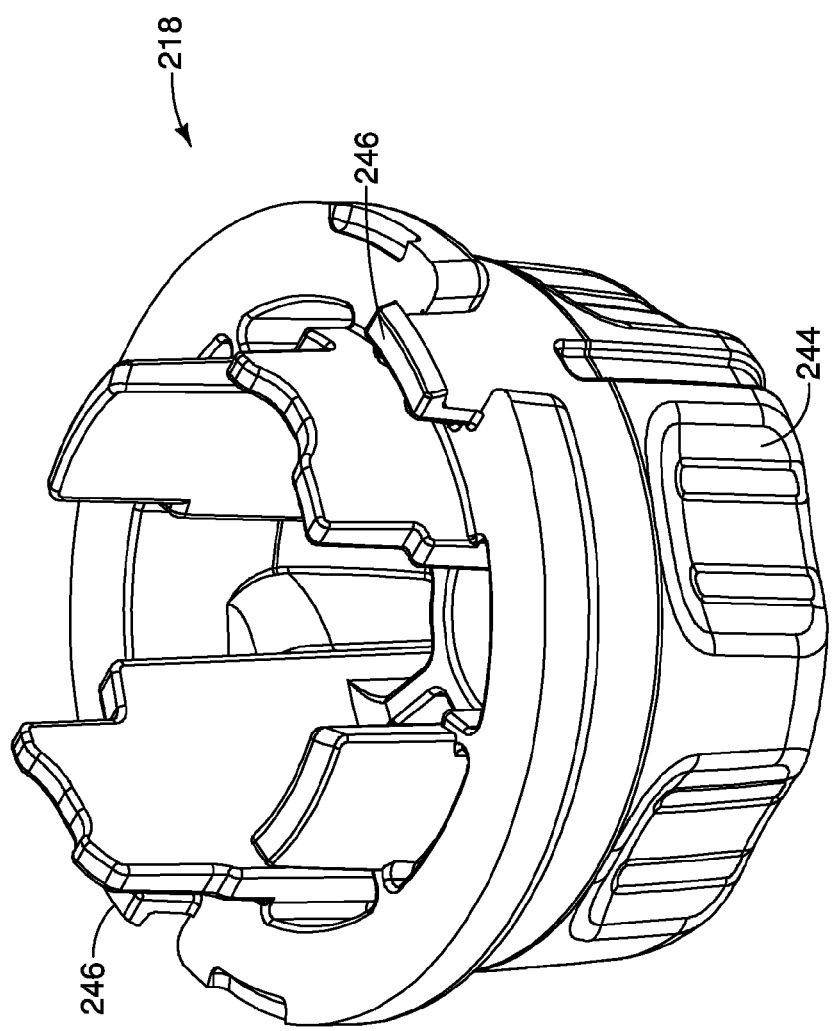
FIG. 7 shows a perspective view of an embodiment of the knob.

FIG. 7 shows a perspective view of the knob 218 having the grip 244 and the pair of tabs 246 that allow the knob 218 to be attached to the spool 210. In other embodiments, the view may not have all of the elements listed and/or may have other elements instead of or in addition to those listed. The shoulder that encircles the outer periphery of the knob 218 is configured to rest on the circular seat 606 of the lower housing 216, thereby preventing the knob 218 from falling through the lower housing 216.

The knob 218 is attached to the spool 210 so that if the interlocking between the spool 210 and the knob 218 is not actively undone (e.g., by pushing the tabs 246 out of the slots 248 and pulling the knob 218 away from the spool 210) one would expect the knob 218 to remain attached to the spool 210. The knob 218 is attached to the spool 210 with a strong enough connection to hinder placing the spool 210 into the casing 209 in an orientation that is inappropriate for the direction of rotation of the motor.

Figure 8A:
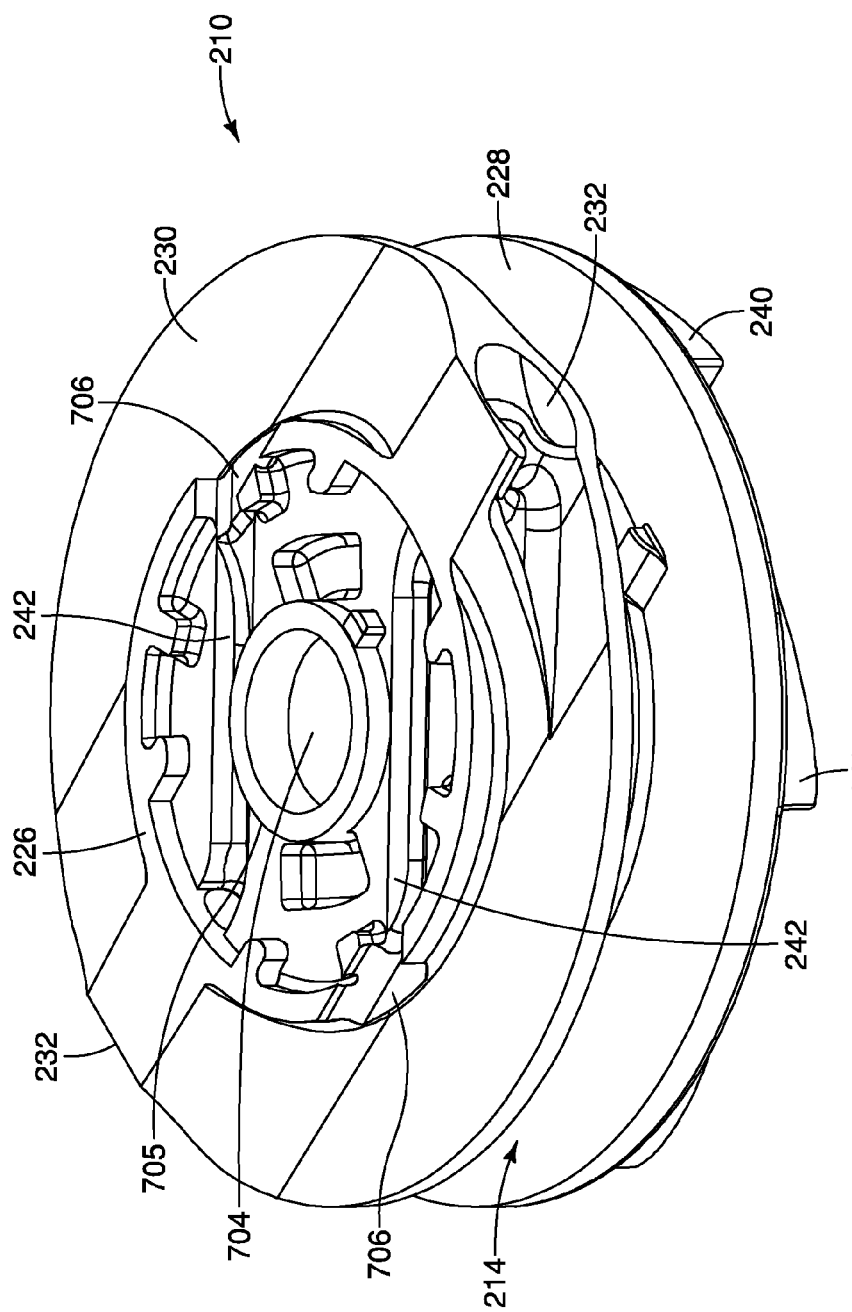
FIG. 8A shows a perspective view of a portion of the spool.

FIG. 8A shows a top perspective view of a portion of the spool 210 in which one of the outer flanges 228 is removed to better show the core 226. The spool 210 includes a pair of outer flanges 228 with a central flange 230 positioned therebetween. An upper channel 214 is defined by the outer peripheral surface of the core 226, the central flange 230 and one of the outer flanges 228; a lower channel 214 is similarly defined by the outer peripheral surface of the core 226, the central flange 230 and the other of the outer flanges 228. The upper and lower channels 214 are configured to receive the wound trimmer line pieces 110. The central flange 230 includes a pair of opposing pathways 232 that each form a passageway from the outer circumferential edge of the central flange 230 to the interior of the core 226. The pathways 232 are configured to each receive a separate piece of trimmer line 110, wherein each of the separate pieces of trimmer line 110 are wound onto a different one of the channels 214. The pathways 232 are connected to a corresponding trimmer line channel 242 that extends through the interior of the core 226. At least a portion of each of the trimmer line channels 242 is formed into the surface of the portion of the central flange 230 located within the core 226. Each of the trimmer line channels 242 carry a portion of one of the trimmer line pieces 110 received therein past the central opening 704. One of the pathways 232 forms one end of each trimmer line channel 242, and the opposite end of the trimmer line channel 242 is defined by a sidewall opening 706. The sidewall openings 706 are apertures formed through the thickness of the core 226 to allow the end of each piece of trimmer line to exit the interior of the core 226. During the winding operation, the portion of the trimmer line 110 that exits the sidewall opening 706 is held in place by wound portions of the trimmer line 110 pressing the end portion against the outer radial surface of the core 226. This prevents the trimmer line pieces 110 from slipping or otherwise being pulled out of the trimmer line channels 242.

Figure 8B:
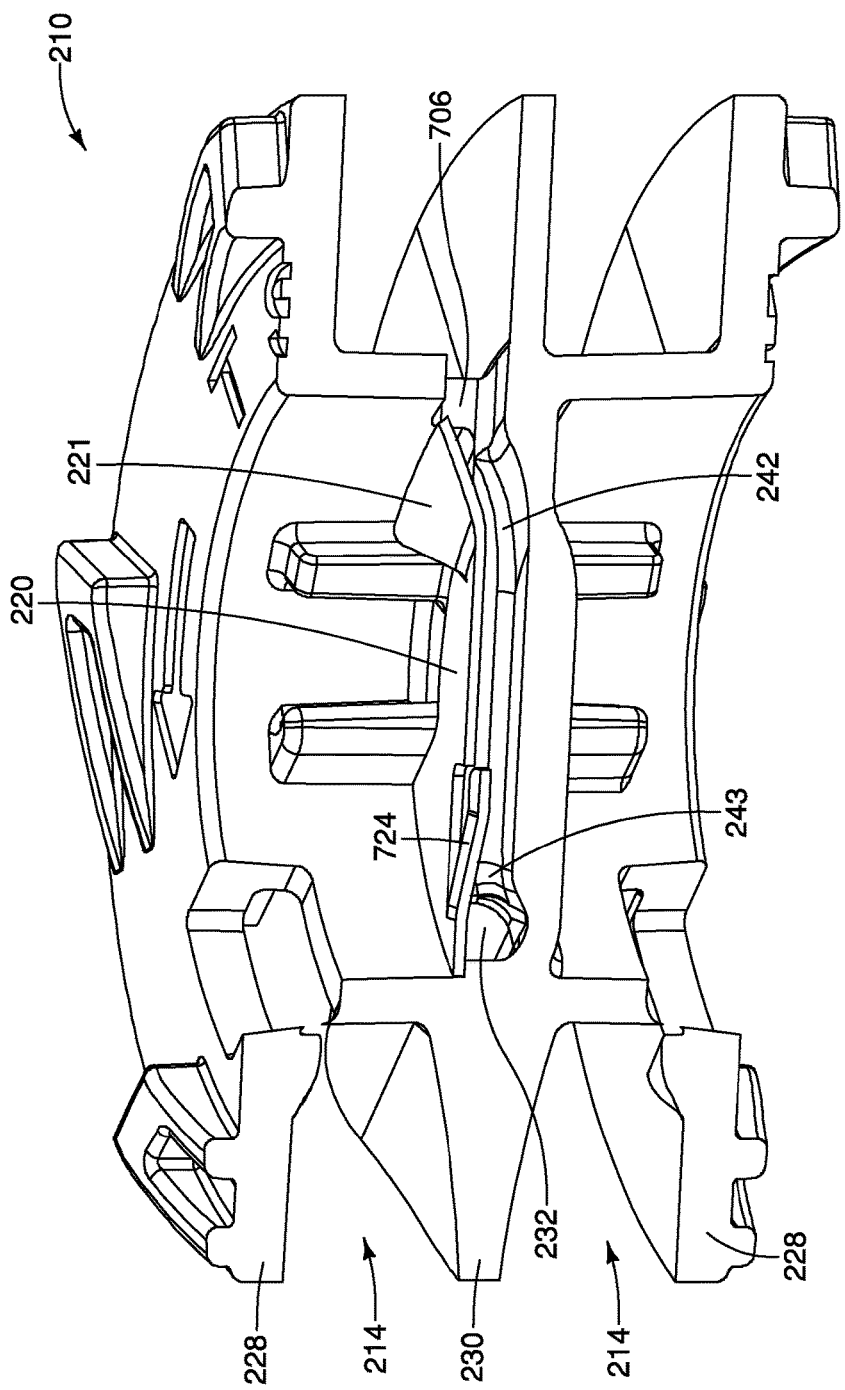
FIG. 8B shows a cross-sectional view of the spool shown in FIG. 6A and the spool cover.

A portion of each trimmer line channel 242 forms a ramp, or raised portion 243, that provides a surface of the trimmer line channel 242 closer to the surface of the central flange 230, as shown in FIG. 8B. In an embodiment, the raised portion 243 is formed along the entire length of the linear portion of the trimmer line channel 242. In another embodiment, only a portion of the raised portion 243 in the linear portion of the trimmer line channel 242 is raised. The raised portions 243 allow the piece of trimmer line pieces 110 to be secured between the raised portions 243 and the spring 724 extending into the trimmer line channel 242 from the spool cover 220.

FIG. 8A shows the spool 210 that includes a central opening 704 configured to receive the projection 236 of the upper housing 208 and the driveshaft 202. The circular collar 705 surrounds the central opening 704. The trimmer line channels 242 are formed into the portion of the central flange 230 and extend between a pathway 232 and a sidewall opening 706. Each trimmer line channel 242 has a curved portion upon exiting the pathway 232, and the curved portion is connected to a linear portion that extends the remaining distance to the sidewall opening 706. The raised portion 243 of the trimmer line channel 242 is shown as extending the entire length of the linear portion, but it should be understood by one having ordinary skill in the art that the raised portion 243 can be formed as only a portion of the linear portion of the trimmer line channel 242. It should also be understood by one having ordinary skill in the art that the trimmer line channel 242 extending between the pathway 232 and the sidewall opening 706 may also follow any other path, including (but not limited to) completely linear or fully curved having no linear portions.

FIG. 8C shows an embodiment in which the spool cover 220 is positioned within the core 226 of the spool 210, wherein the central aperture 726 of the spool cover 220 receives the collar 705 of the spool 210. The tabs 221 of the spool cover 220 assist in positively positioning the spool cover 220 within the core 226. The springs 724 of the spool cover 220 are configured to extend downwardly into the trimmer line channels 242 (not shown). In the illustrated embodiment, the spool cover 220 includes a plate 222 and a pair of springs 724 extending from the plate at an angle. The plate 222 is a substantially planar member having two lobes 724 located between two tabs 221 configured to be received within corresponding ribs extending inwardly from the inner wall of the core 226. The pair of opposing lobes 724 extending from the plate 222 are shaped differently than the pair of tabs 221, which ensures that the spool cover 220 is properly oriented rotationally (about the central opening 704) within the core 226. The spool cover 220 is installed within the core 226 such that the springs 724 extend into a corresponding trimmer line channel 242. The spool cover 220 further includes a central aperture 726 configured to receive the collar 705 of the spool 210 that defines the central opening 704 of the spool 210.

FIGS. 9A-9C shows a spool cover 220 that includes a plate 222 that is positionable immediately adjacent to the portion of the central flange 230 located within the core 226. The spool cover 220 further includes at least one cantilevered spring 724 extending downwardly into the trimmer line channel 242. The cantilevered spring 724 extends from the plate 222 at an angle. In the illustrated embodiment, each cantilevered spring 724 includes an angled portion that extends downwardly from the plate 222 and a flat portion that extends from the end of the angled portion. The angled portion is configured to contact and press against the trimmer line piece 110 located within the trimmer line channel 242. The spring 724 is configured to pinch, or otherwise removably secure a piece of trimmer line between the spring 724 and the raised portion 243 within the trimmer line channel 242. The spring 724 extends downwardly and away from the plate 222 in the direction of insertion of the trimmer line pieces 110 into the trimmer line channel 242. As such, as the trimmer line pieces 110 are inserted into the pathways 232 and they enter the trimmer line channels 242, each trimmer line piece 110 passes over the raised portion 243 and push upwardly against the spring 724, thereby creating a biasing force from the spring 724 onto the trimmer line piece 110. The trimmer line piece 110 continues to be extended along the length of the trimmer line channel 242 before exiting the core 226 through a sidewall opening 706 at the end of the trimmer line channel 242. The biasing force from the spring 724 is sufficient to allow the trimmer line piece 110 to be threaded through the core 226 but also prevents easy withdrawal of the trimmer line from the trimmer line channel 242 without a pulling force significant enough to overcome the biasing force from the spring 724. The spring 724 allows the trimmer line piece 110 to be easily secured within the trimmer line channel 242 during the initial insertion of the trimmer line piece 110 as well as during the first few rotations of the spool 210 during the winding and loading of the trimmer line piece 110 into either the upper or lower channel 214.

In the embodiment of the spool cover 220 shown in FIGS. 9A-9B, the spool cover 220 includes a notch 730 that extends from the collar 705 that defines the 704 of the spool 210. The notch 730 is configured to receive an indexing tab 732 that extends radially outward from the collar 705 of the spool 210. The indexing mechanism between the spool cover 220 and the spool 210 also ensures that the spool cover 220 is properly aligned within the core 226 of the spool 210.

FIG. 9A shows a top perspective view of the spool cover 220 formed of a plate 222 and a pair of springs 724 extending therefrom in a cantilevered manner. The plate 222 of the spool cover 220 includes a top surface 720 and a bottom surface 722. The bottom surface 722 of the spool cover 220 is configured to be positioned immediately adjacent to the portion of the central flange 230 within the core 226. The spool cover 220 includes a pair of springs 724 extending at an angle from the top surface 720. The springs 724 are formed as cantilever springs, wherein the spring constant of the material of the spool cover 220 allow the springs 724 to provide a biasing force. Each of the springs 724 is positionable within one of the trimmer line channels 242 formed into the spool 210 when the spool cover 220 is positioned adjacent to the spool 210. When the spool cover 220 is positioned adjacent to the spool 210, the springs 724 are extend into the trimmer line channels 242 above the raised portion 243. The springs 724 cooperate with the raised portions 243 to provide a reduced cross-section of the trimmer line channels 242, wherein the reduced cross-section is configured to grasp and secure the trimmer line pieces 110 threaded therethrough, particularly during the initial winding of the trimmer line pieces 110 onto the spool 210. The cantilevered springs 724 allow the trimmer line pieces 110 to pass through the reduced cross-section of the trimmer line channel 242 while effectively preventing the trimmer line pieces 110 from slipping and being withdrawn through the pathway 232. It should be understood by one having ordinary skill in the art that the spring constant of the springs 724 is sufficient to secure the trimmer line pieces 110 during the initial winding of the trimmer line pieces 110 onto the spool 210 but is weak enough to allow the user to grasp the last small portion of the trimmer line piece 110 and remove the trimmer line piece from the spool 210 by pulling the trimmer line piece 110 through the pathway 232.

FIG. 9C is a side view of the spool cover 220 having top and bottom surfaces 720, 722. In the illustrated embodiment, the spool cover 220 includes at least two opposing tabs 221 which are angled away from the planar top surface 720 of the spool cover 220. The tabs 221 are configured to contact surfaces of the knob 218, which allows the knob 218 to exert biasing pressure onto the tabs 221 thereby ensuring that the spool cover 220 remains positioned immediately adjacent to the portion of the central flange 230 within the core 226.

FIG. 10A shows a top view of an embodiment of the upper housing 208. The upper housing 208 includes the central aperture 238 formed through the projection 236 that extends inwardly from the inner surface of the upper housing 208, eyelet supports 502, and the slots 225 configured to receive the tabs 224 of the lower housing 216. In other embodiments, the upper housing 208 may not have all of the elements listed and/or may have other elements instead of or in addition to those listed.

Central aperture 238 is an opening at the center of the top of the upper housing 208 through which the secondary connector 203 is inserted (FIG. 2). In an embodiment, the upper housing 208 includes a non-circular opening that is also a seat for an enlarged noncircular portion of the secondary connector 203. The non-circular opening mates with the enlarged portion of the driveshaft 202, so that when motor 102 causes the driveshaft 202 to spin, the upper housing 208 (and therefore the entire the trimmer head 108) spins with the driveshaft 202.

The slots 225 receive and engage the tabs 224 that extend from the lower housing 216 releasably securing the upper housing 208 to the lower housing 216. The tabs 224 (FIG. 5A) are adapted to pass through correspondingly shaped openings formed in the sidewall of the upper housing 208. At their upper ends the tabs 224 have radially outwardly directed lips. As the tabs 224 are inserted through the slots 225, the tabs flex radially inwardly until such time that lips pass completely through the apertures whereby the tabs assume their unflexed positions and the lips latchingly engage the lower housing 216 with the upper housing 208. Alternatively, it will be understood that the lipped tabs or similar structure may be carried by the upper housing 208 and corresponding slots may be provided, where appropriate, in the circumferential wall or the end wall of the lower housing 216 in order to achieve the desired latching engagement between the upper and lower housings 208, 216 of the casing 209. Eyelet supports 502 cover and receive the eyelets 204 (FIG. 2) therein, and together with the eyelet supports 502 of the lower housing 216 secure the eyelets 204 in place within the sidewall of the casing 209.

FIG. 10D shows a top view of the upper housing 208. The upper housing 208 includes the projection 236, the central aperture 238, the slots 225, the eyelet supports 502, the eyelets 204, and the ribs 234. In other embodiments, the upper housing 208 may not have all of the elements listed and/or may have other elements instead of or in addition to those listed.

As depicted in FIGS. 10A-10D, the upper housing 208 includes a central aperture 238. Prior to assembly of the trimmer head 108, the secondary connector 203 that is threadingly engaged to the driveshaft 202 is inserted through the central aperture 238 and a fastener 206 is attached to the secondary connector which secures the upper housing 208 to the driveshaft 202.

The following discussion further elaborates on how the various components of string trimmer 100 interact and function repeating some information already discussed above for clarity. In an embodiment, for example, the ramps 240 are adapted to cooperate with ribs 234 provided on the inner face of both the upper and lower housings 208, 216. The ramps 240 are received in the depressions between the ribs 234. It will be understood that the relative positions of the ramps 240 and ribs 234 may be reversed. That is, suitable sloped ramps 240 may be provided in the inner faces of the upper housing 208 and the lower housing 216 and cooperating ribs 234 may be formed in the outer faces of the outer flanges 228. The ramps 240 are normally retained in the depressions between the ribs 234 under the influence of the compression force of the biasing mechanism 212.

Accordingly, the sloped surfaces (e.g., cam surfaces) of the ramps 240 and on the outer flanges 228 are inclined in such a way that the spool 210 is capable of practical rotation in one direction (e.g., counterclockwise) when the outer flange 228 faces upwardly and rotates in the opposite direction (e.g., clockwise) when the other outer flange 228 faces upwardly.

With this capability, the spool 210 of the trimmer head 108 may be used, regardless of whether the trimmer's driveshaft rotates clockwise or counterclockwise.

Referring to FIGS. 2A and 3, the knob 218 is suitable for enabling a user to wind trimmer line pieces 110 onto the spool 210. The knob 218 includes the grip 244, which is adapted to project through a central aperture 604 provided in the lower housing 216. The grip 244 may be provided with a plurality of raised grip enhancing formations about its periphery. The inner face of the closed end of the lower housing 216 surrounding the central aperture 604 is provided with a circular seat 606, which is dimensioned to closely receive the flange of the knob 218.

It should be noted that the spool cover 220 may be placed within the core 226 of the spool 210 by an assembly person/worker at a plastic injection mold factory, for example. The combination of the spool cover 220 and the spool 210 may be sold preassembled.

The eyelets 204 may be fixed and preassembled to the upper housing 208 by an assembly person/worker and may be metal (or another material, such as plastic). Each of the eyelets 204 slide into a corresponding eyelet support 502 formed into the sidewall of both the upper and lower housings 208, 216. The eyelets 204 can be installed by hand without the use of tools and removed and replaced by hand as well.

One method of assembly of the trimmer head 108 is as follows: a user first inserts the grip 244 portion of the knob 218 into the lower housing 216 until the flange comes to rest against the circular seat 606 of the lower housing 216. The user then places the spool cover 220 into the core 226 of the spool 210. Next, the user places the spool 210 and spool cover 220 into the lower housing 216, wherein the spool cover 220 is positively secured within the core 226 by way of the knob 218. The tabs 246 of the knob 218 are inserted into the slots 248 of the spool 210, thereby attaching the knob 218 to the spool 210 and sandwiching the spool cover 220 between the knob 218 and the spool 210.

When inserting the spool 210 into the lower housing 216, the user may orient the spool 210 in a manner in which the ramps 240 extending from the outer flanges 228 determines the desired rotation of the trimmer head 108. In an embodiment, the direction of winding is dictated by the direction of rotation of the driveshaft 202. If the driveshaft 202 rotates counterclockwise, then the direction for winding the trimmer line pieces 110 onto the spool 210 is clockwise, and if the driveshaft 202 rotates clockwise, then the direction for winding the trimmer line pieces 110 onto the spool 210 is counterclockwise.

The biasing mechanism 212 is then placed into the upper housing 208 and located about the projection 236. The lower housing 216, knob 218, spool cover 220, and the spool 210 are brought into engagement and attachment with the upper housing 208, wherein the tabs 224 of the lower housing 216 are received by the slots 225 of the upper housing 208.

Referring to FIG. 8B, it will be seen that the spool 210 when joined with the spool cover 220 includes a pair of continuous and open non-linear trimmer line guide passageways formed from pathways 232, trimmer line channels 232, and sidewall openings 706, which may be formed coplanar with, or integral with, the central flange 230.

As seen in FIG. 8B, each trimmer line channel 242 communicates with a pair of opposing openings to the channel, which is a pathway 232 formed in the central flange 230 and a sidewall opening 706 through the core 226. The trimmer line channels 242 are constructed and arranged to ensure that the trimmer line pieces 110 are properly wound on both upper and lower channels 214 of the spool 210 equally during reloading of trimmer line onto the spool 210. Also, it may be beneficial for the outwardly-opening end of each pathway 232 to be funnel or flare shaped to facilitate insertion of a trimmer line piece into the pathway 232. In order to load the trimmer line pieces 110 into the trimmer head 108, the pathways 232 are first brought into alignment with the eyelets 204. The separate trimmer line pieces 110 should be long enough to load the spool 210 with enough trimmer line so that trimmer line may be released at least once after the initial length of trimmer line wears out, and the trimmer line pieces 110 should also be short enough so that the pieces of trimmer line fit on the spool 210. One of ends of the trimmer line pieces 110 is inserted into either eyelet 204 and by feeding and/or pushing the trimmer line pieces 110 through the pathway 232 of the spool 210 until the trimmer line piece 110 passes through the trimmer line channel 242 and out of the opposite sidewall opening 706, being pinched or otherwise secured between a spring 724 of the spool cover 220 and a raised portion 243 in the trimmer line channel 242.

The trimmer line pieces 110 (FIG. 1) should then be adjusted so that approximately equal lengths of trimmer line project from each eyelet 204. The user then winds the knob 218 in the direction that is free to turn the spool 210, and the trimmer line pieces 110 are drawn into the housing and wound upon the upper and lower channels 214 of the spool 210. The sloped surfaces of the ramps 240 allow a user to be able to easily turn the knob 218, which ratchets in one direction and cannot easily move in the opposite direction. As the knob 218 is turned, the ramps 240 make contact with indexing ribs 234 in the lower housing 216 that glide upward and over the rib and then drop into the depression between adjacent ribs which locks the spool from turning in the opposite direction. The substantially vertical stop faces 714 of the ramps 240 prevent uncontrolled discharge of trimmer line during vegetation trimming.

The trimmer head 108 is a bump indexing variety of trimmer head. That is, the trimmer head 108 permits user-controlled discharge of the trimmer line pieces 110 utilizing the centrifugal force generated by the rapid rotation of the trimmer head 108. More particularly, when the bottom of the knob 218 is tapped against a hard surface, the biasing force of the biasing mechanism 212 is momentarily overcome. Consequently, the substantially vertical stop faces 714 of the ramps 240 are momentarily displaced from contact with the corresponding ribs 234. During this brief instant, centrifugal force resulting from the rotation of the trimmer head 108 causes the trimmer line pieces 110 to be discharged through the eyelets 204. Thereafter, the biasing mechanism 212 re-seats the spool into engaging contact between the stop faces 714 of the ramps 240. It is also possible to unload the trimmer line pieces 110 from the trimmer head 108 in a fully manual mode. As such, when the user desires to extract the trimmer line pieces 110 from the head, he or she brings the trimmer head 108 to a complete stop, pushes the bottom of knob 218 inwardly against the biasing force of the biasing mechanism 212, while turning the knob 218 and pulling on the trimmer line pieces 110 to extract the desired length of line from the spool 210. When sufficient trimmer line has been discharged or unwound, the user releases the knob 218 and resumes trimming.

Figure 11:
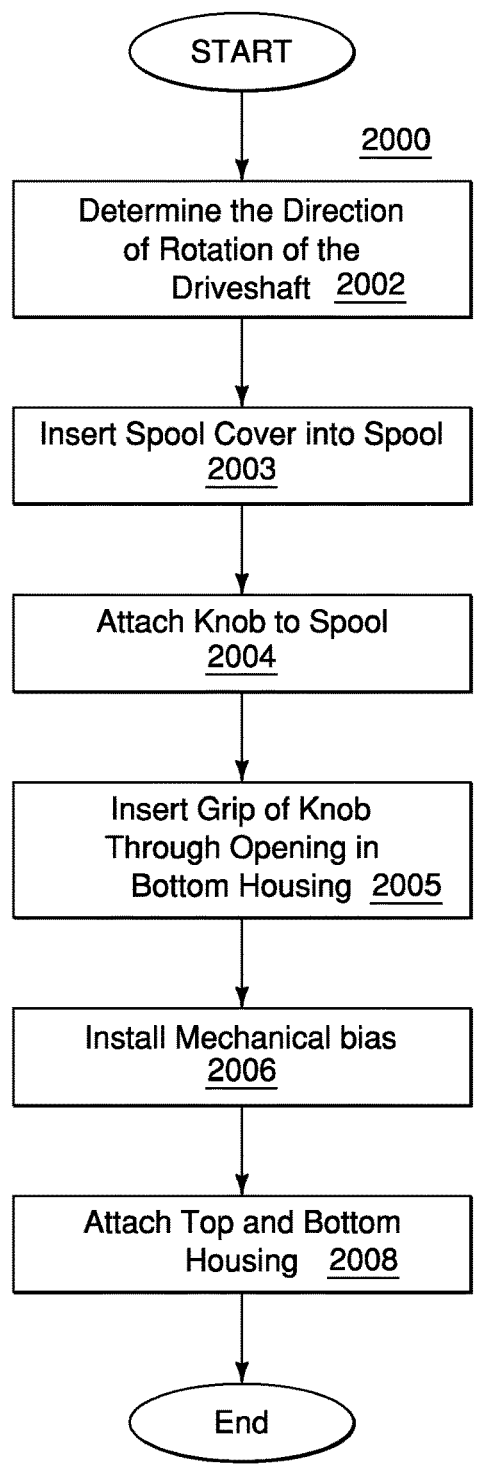
FIG. 11 shows a flowchart of an embodiment of a method of assembling the trimmer head of FIG. 4.

FIG. 11 shows a flowchart of an embodiment of a method 2000 of assembling the trimmer head 108 (FIG. 1). In step 2002, a determination is made as to which outer flange 228 is inserted facing upwardly, which depends on whether string trimmer 100 has a driveshaft 202 that turns clockwise or counterclockwise. In an embodiment, the direction of winding is dictated by the direction of rotation of the driveshaft 202. If the driveshaft 202 rotates counterclockwise, then the direction for winding the trimmer line pieces 110 onto the spool 210 is clockwise, and if the driveshaft 202 rotates clockwise, then the direction for winding the trimmer line pieces 110 onto the spool 210 is counterclockwise.

In step 2003, the user inserts the spool cover 220 into the core 226 of the spool 210.

In step 2004, the user attaches the knob 218 to a side of the spool 210 determined by the direction of rotation that the motor rotates the driveshaft 202. The knob 218 is attached to the spool 210 by inserting the tabs 246 of the knob 218 into the slots 248 of the spool 210.

In step 2005, a user inserts the grip 244 of the knob 218 into the lower housing 216, until knob flange comes to rest against the circular seat 606 of the lower housing 216.

In step 2006, the biasing mechanism 212 is then about the projection 236 of the upper housing 208.

In step 2008, the user attaches the bottom housing 216 to the top housing 208 by inserting the tabs 224 of the lower housing 216 into the slots 225 of the upper housing 208.

Once the trimmer head 108 has been assembled, the trimmer head 108 can be rotatably connected to the shaft 106 by securing the driveshaft 202 to the trimmer head 108

Figure 12:
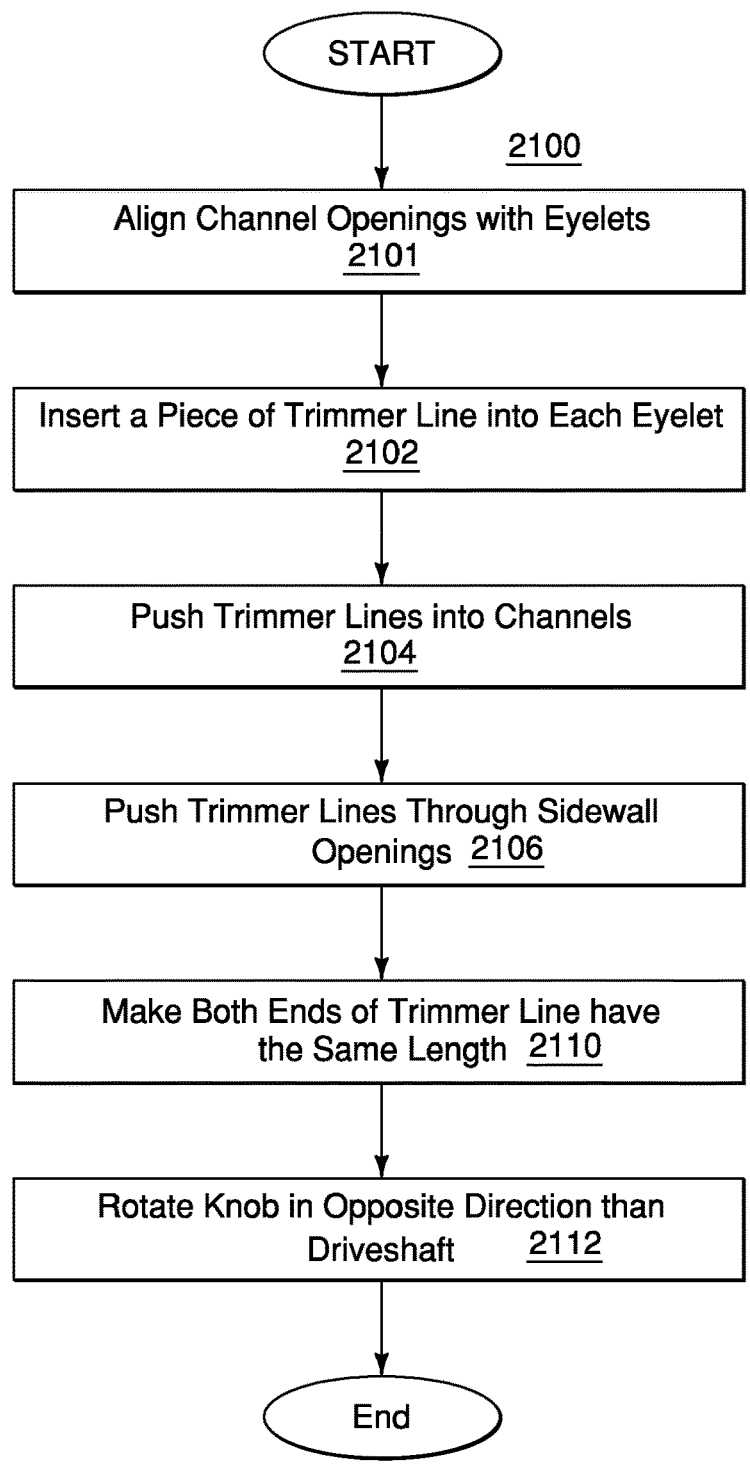
FIG. 12 shows a flowchart of an embodiment of a method for loading trimmer line into the trimmer head of FIG. 4.

FIG. 12 shows a flowchart of an embodiment of a method 2100 for loading the trimmer line pieces 110 into trimmer head 108. In step 2101, in order to load the trimmer line pieces 110 (FIG. 1) into the trimmer head 108, the pathways 232 of the spool 210 are first brought into alignment with the eyelets 204 by turning the knob 218 until they are properly aligned. In step 2102, one end of each piece of trimmer line pieces 110 is inserted into one of the eyelets 204. As part of step 2102, two separate fixed lengths of the trimmer line pieces 110 may be used, wherein each piece is long enough to load onto the spool 210 so that each piece of trimmer line pieces 110 may be released at least once after the initial length of trimmer line wears out and short enough so that the trimmer line fits on the spool 210.

In step 2104, each piece of trimmer line pieces 110 (FIG. 1) is pushed through the pathway 232 and through the length of the corresponding trimmer line channel 242a. In step 2106, each piece of trimmer line pieces 110 is pushed through the trimmer line channel 242 in the core 226 of the spool 210 until it exits through the corresponding sidewall opening 706. In step 2110, both pieces of trimmer line pieces 110 are adjusted until the ends of the trimmer line sticking out of both the eyelets 204 are about equal in length. In another embodiment, step 2110 can be skipped, which means that the pieces of trimmer line pieces 110 extending from the eyelets 204 may be different.

In step 2112, the knob 218 is rotated in the opposite direction as the motor 102 would otherwise cause the spool 210 to rotate, which includes sliding the ramps 240 and over the ribs 234. As part of step 2112, the pieces of trimmer line pieces 110 should then be adjusted so that approximately equal lengths of line project from each eyelet 204. In step 2112, the user then winds the knob 218 or 518 of the trimmer head 108 (FIG. 1) in the direction that is free to turn, which turns the spool 210 and the trimmer line pieces 110 is drawn into the housing and wound upon the upper and lower channels 214 of the spool 210. During step 2112, the sloped surfaces of the ramps 240 allows a user to be able to easily turn the knob 218, which ratchets in one direction and cannot easily move in the opposite direction. As the knob 218 is turned, the ramps 240 make contact with the ribs 234 in the lower housing 216 (FIG. 2) that glide upward and over the ribs 234 and then drop into the depression between ribs 234, which locks the spool 210 from turning in the opposite direction. In step 2112, the substantially vertical stop faces 714 of the ramps 240 prevent uncontrolled discharge of the trimmer line pieces 110 during vegetation trimming.

Figure 13:
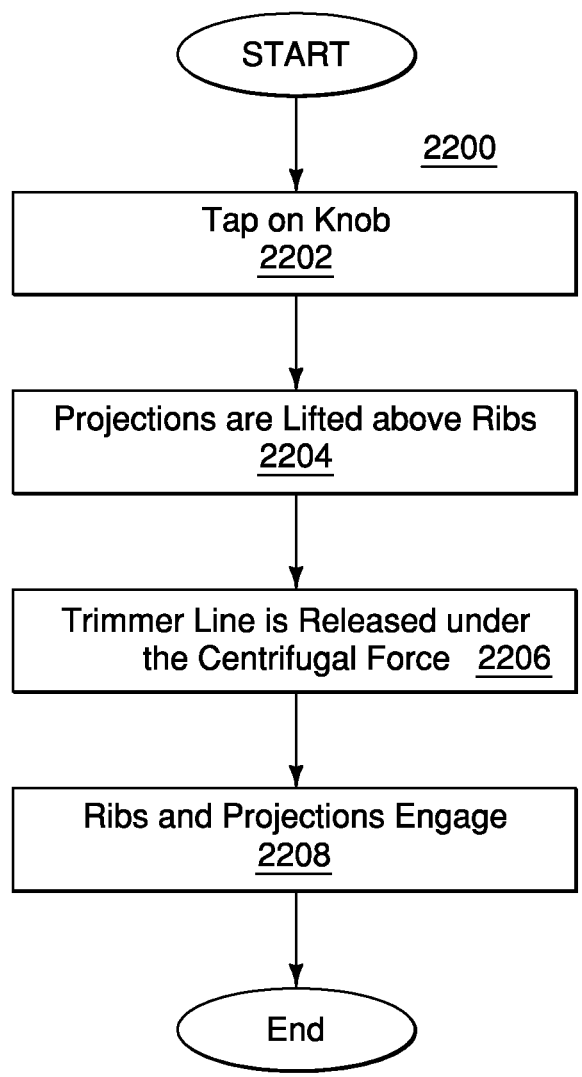
FIG. 13 shows a flowchart of an embodiment of a method for releasing trimmer line from the trimmer head of FIG. 4.

FIG. 13 shows a flowchart of an embodiment of a method 2200 for releasing the trimmer line pieces 110 from the trimmer head 108 (FIG. 1). In step 2202, while in operation, the knob 218 is tapped on something, such as the ground. In step 2204, as a result of the tap of the knob 218 onto a solid surface, the ramps 240 are lifted above the ribs 234, thereby causing the spool 210 to rotate at a different rate than the upper housing 208 and the lower housing 216. In step 2206, the centrifugal force causes the trimmer line pieces 110 to unwind off of the spool 210. In step 2208, the stop face 714 of one of the ramps 240 hits one of ribs 234, causing the spool 210 to rotate with the upper housing 208 and stopping the trimmer line pieces 110 from unwinding further.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A trimmer head comprising:
   a spool having a core, a central flange having a portion extending radially outward from said core and a portion located within said core, a pair of outer flanges extending outwardly from said core and in which each of said outer flanges is spaced apart from an opposing side of said central flange to form an upper channel between one of said outer flanges and said central flange and a lower channel between the other of said outer flanges and said central flange, and a pair of trimmer line channels formed into said portion of said central flange within said core;
   a spool cover having a plate and a pair of cantilevered springs extending at an angle from said plate, said spool cover positionable immediately adjacent to said portion of said central flange located within said core, and each of said springs extending into one of said trimmer line channels of said spool;
   a knob releasably attachable to said spool;
   an upper housing; and
   a lower housing attachable to said upper housing to form a casing, wherein said spool, spool cover, and a portion of said knob are positioned between said upper and lower housings, and said casing having a pair of opposing eyelets for receiving said pair of trimmer lines.

2. The trimmer head of claim 1, wherein each of said trimmer line channels includes a raised portion therein.

3. The trimmer head of claim 2, wherein each of said springs of said spool cover is positioned adjacent to one of said raised portions in said trimmer line channel to form a reduced cross-section therebetween, and said trimmer lines within said trimmer line channels are releasably securable between said springs and said raised portions.

4. The trimmer head of claim 1, wherein a biasing mechanism is located between said spool and said upper housing, said biasing mechanism biases said spool into engagement with said lower housing.

5. The trimmer head of claim 1 further comprising a plurality of ramps extending from each of said outer flanges.

6. The trimmer head of claim 5, wherein each ramp includes a sloped top and a stop face.

7. The trimmer head of claim 6, wherein at least one of said upper and lower housing include a plurality of ribs extending from an inner surface thereof, said stop faces of said ramps engageable with at least one of said ribs to prevent rotation of said spool relative to said casing.

8. The trimmer head of claim 1, wherein said spool is positionable within said casing in two different orientations.

9. The trimmer head of claim 1, wherein a pair of opposing pathways are formed into said central flange, each of said pathways being connected to one of said trimmer line channels to allow a piece of trimmer line to be insertable into said corresponding channel through said pathway.

10. The trimmer head of claim 9, wherein a pair of sidewall openings are formed through said core, each of said sidewall openings being connected to one of said trimmer line channels to allow a piece of trimmer line to exit said trimmer line channel and said core.

11. A trimmer head comprising:
a spool having a core, a central flange having a portion extending from said core and a portion located within said core, a pair of trimmer line channels formed into said portion of said central flange within said core, and a pair of sidewall openings formed through said core wherein each of said sidewall openings connects to one of said trimmer line channels;
a spool cover positioned immediately adjacent to said portion of said central flange located within said core, wherein said spool cover encloses said trimmer line channels;
a knob releasably attachable to said spool,
an upper housing; and
a lower housing attachable to said upper housing, wherein at least a portion of said spool and said knob are positioned between said upper and lower housings, and said upper and lower housings forming a pair of opposing eyelets.

12. The trimmer head of claim 11, wherein said spool further includes a pair of pathways extending from an outer peripheral edge of said central flange to said core wherein each of said pathways connects to an end of one of said trimmer line channels, said pair of pathways are alignable with said eyelets.

13. The trimmer head of claim 11, wherein said knob and said spool are selectively rotatable relative to said housing.

14. The trimmer head of claim 13, wherein said spool includes an upper channel and a lower channel surrounding said core.

15. The trimmer head of claim 11, wherein said spool includes a collar defining a central opening through said portion of said central flange within said core, said collar having an indexing tab extending outwardly therefrom, wherein said indexing tab is received within a notch formed in said spool cover for properly aligning said spool cover relative to said spool.

16. A trimmer head comprising:
an upper housing;
a lower housing releasably attachable to said upper housing to form a casing, wherein said casing includes at least a pair of eyelets for receiving a piece of trimmer line into each of said pair of eyelets;
a spool positioned within said casing, said spool comprising:
a central flange, wherein a portion of said central flange extends radially outward from a core and a portion of said central flange is within said core, said central flange having an upper surface and a lower surface;
a pair of trimmer line channels formed into said upper surface of said portion of said central flange within said core, wherein each of said trimmer line channels includes an inlet aperture and an outlet aperture formed through said core; and
a knob attached to said spool, wherein a portion of said knob extends from said casing, and wherein rotation of said knob causes rotation of said spool for winding said trimmer line pieces onto said spool and bumping said knob against a surface causes said trimmer line pieces to be partially unwound from said spool; and
a spool cover positioned within said core of said spool, wherein said spool cover encloses said trimmer line channels and is sandwiched between said knob and said portion of said central flange within said core.

* * * * *